Dec. 16, 1958 C. B. TRIMBLE 2,864,609

TAPE-FEEDING MEANS FOR RECORD TAPE

Filed Sept. 30, 1954 6 Sheets-Sheet 1

INVENTOR
CEBERN B. TRIMBLE
BY Carl Beust
Wilfred G. Caldwell
HIS ATTORNEYS

INVENTOR
CEBERN B. TRIMBLE
BY Earl Beust
Wilfred G. Caldwell
HIS ATTORNEYS

Dec. 16, 1958 C. B. TRIMBLE 2,864,609

TAPE-FEEDING MEANS FOR RECORD TAPE

Filed Sept. 30, 1954 6 Sheets-Sheet 3

INVENTOR
CEBERN B. TRIMBLE
BY Earl Bausch
Wilfred G. Caldwell
HIS ATTORNEYS

INVENTOR
CEBERN B. TRIMBLE
BY Earl Bennett
Wilfred G. Caldwell
HIS ATTORNEYS

Dec. 16, 1958 C. B. TRIMBLE 2,864,609

TAPE-FEEDING MEANS FOR RECORD TAPE

Filed Sept. 30, 1954 6 Sheets-Sheet 5

INVENTOR
CEBERN B. TRIMBLE

BY Karl Sennst
Wilfred G. Caldwell

HIS ATTORNEYS

Dec. 16, 1958 C. B. TRIMBLE 2,864,609

TAPE-FEEDING MEANS FOR RECORD TAPE

Filed Sept. 30, 1954 6 Sheets-Sheet 6

INVENTOR
CEBERN B. TRIMBLE

BY Karl Benst
Wilfred G. Caldwell

HIS ATTORNEYS

United States Patent Office 2,864,609

Patented Dec. 16, 1958

2,864,609

TAPE-FEEDING MEANS FOR RECORD TAPE

Cebern B. Trimble, Dayton, Ohio, assignor to The National Cash Register Company, Dayton, Ohio, a corporation of Maryland Application September 30, 1954, Serial No. 459,476

33 Claims. (Cl. 271—2.6)

The present invention relates to tape-reading apparatus and particularly to a feeding arrangement for cooperation with a reading unit or station capable of the continuous and high-speed interpretation of tape-carried information.

In general, tape readers perform the function of changing the manner of epression of information. The tape record is usually conveniently obtained and represents stored information which it is desired to utilize in the future. The reader senses or reads the information and provides an output representative thereof, but in a form utilizable by a device having an assigned special purpose with respect to the tape-carried information. The special purpose may be that of sorting the information or storing it in readily available form, usually in discrete parts indicative of events, transactions, or the like, wherein each part comprises units of information or digits of a transaction.

In order to permit the utilizing device to assimilate the reader output properly, the discrete parts of the information may constitute frames, consecutive frames being of the same length or of differing lengths depending upon the amount of information constituting a frame, and the reader output is interrupted between frames. The interruption is established by arresting the movement of the tape, usually in accordance with "stop" or "end of frame" signals carried by the tape and sensed by the reader. The duration of the interruptions may be under the control of the utilizing device, which then determines tape starting when further information may be handled, or tape movement may be automatically re-established after a predetermined time interval.

However, since the utilizing device may be an electronic circuit or under the control of such a circuit, it is very desirable that the tape speed be high and that the units or digits be closely spaced in order that the full capabilities of the electronic circuit or utilizing device may be realized. These requirements present the problem of stopping the tape almost instantaneously, or at least within the time interval between the passage of successive digits of the tape past a given point, such as the reading station, so that information will not be lost or reading impaired.

The prior art includes many types of mechanisms and circuits of various complexities for effecting the starting and stopping of the tape. Usually included are capstan drivers and associated pressure rollers to insure sufficient frictional contact between the tape and the capstans. Tensioning arms and stabilizers are normally included in such apparatus in an effort to secure uniform tape movement. Ordinarily, stopping is effected by interrupting the drive to the capstan and/or by a brake, which may be of the electro-mechanical variety, adapted to bear against the capstan or an extension thereof, whereas other arrangements apply a braking force to the tape supplying or take-up reels, particularly when the tape possesses some degree of rigidity, such as magnetic tapes of the stainless steel variety. Arrangements including servo controlled reels are also known, wherein the various servo windings are electrically energized to exercise the starting and stopping functions. The former types of feeding mechanisms are inherently slow-acting because of the moving mass of such components as the tape supply and take-up reels and the driving capstans. Reliability and maintenance become significant factors, since alinement must be preserved and because of tape irregularities and also wear of the components themselves. Complicated differential driving mechanisms have been produced to reduce the problem of tape alinement, but in such complicated mechanisms the cost is almost prohibitive, and the inertia of the gears, if satisfactorily overcome, works the mechanism rigorously. Needless to say, the electro servo mechanisms are also costly and further usually require some tensioning or slack-absorbing mechanisms.

With the foregoing in mind, among the objects of the present invention are the following: The provision of tape-feeding apparatus employing simple principles of operation, thereby extending the expected life of the equipment and minimizing the maintenance requirements; the provision of such apparatus admitting of relatively inexpensive components, each rugged in nature and easily fabricated; the provision of such an apparatus wherein the mass of any of the moving components does not affect the tape starting and stopping, thereby insuring an inherently speedy design; the provision of compact tape-feeding apparatus capable of providing extremely reliable and uniform drive while avoiding use of many of the complicated members of the aforementioned type necessary in the prior art devices; the provision of tape-feeding mechanism of the automatic character; and the provision of a driving mechanism of the capstan variety wherein the capstan is continuously rotated, the tape is maintained under tension or preloading during driving, and the tape is positively gripped during braking.

The objects of the invention are accomplished by employing a continuously-operating driving means generally in the form of a capstan, which yieldably engages the tape to move it along a path through the reading station. A main or high-speed brake is disposed along the path to engage the tape, normally applying insufficient pressure thereto to arrest its motion, and means is included for causing the brake to grip the tape when it is desired to arrest its motion. Although the capstan drives the tape through frictional engagement therewith, as afforded by a pressure roll, the arrangement is such that, when the brake grips the tape, slippage is established between the capstan, the pressure roll, and the tape, permitting the latter to be arrested almost instantaneously.

The brake is preferably of the eletro-magnetic type wherein the armature "floats" or rests upon the tape, which passes over the stator laminations. A feature of the invention resides in such a provision because the armature provides a certain degree of preloading in the form of pressure effective against the tape at all times, so that, when a stop-order is received, the pressure is merely increased electro-magnetically, the armature moving only an infinitesimal amount to cause the gripping action, which immediately arrests the tape movement. In this manner, the tape is actually caused to stop within the interval of the stop signal, which has a tape length considerably less than the spacing between adjacent digits on the tape. Ordinarily, the stop signals are located at the end of the frames or units of information, and the spacing between adjacent frames need be no more extensive than that between adjacent digits contained within a given frame.

The tape feeding and reading means of the invention to be described is capable of reading tape supplied, for example, from a basket and deposited on the floor, such tape being merely a temporary record or the like which it is desired to read once and then discard. The use of a minimum number of idlers or undriven tape-guiding rolls in suitable location with the brake, the reading station, and the driving capstan provides a pathway for the tape. In the alternative, the combination presented is capable of feeding and reading an endless loop of tape where it is desired to provide, for example, a cyclically-repetitive output from the reading unit.

Often it is desired to read a roll of tape obtained, for example, from a cash register or accounting machine or other form of business machine, which record is to be preserved. The present invention provides a tape supply reel and a tape take-up real adapted for incorporation in the tape feeding mechanism in such a manner that both reels may be considered practically inertialess, the moving mass of the reels having negligible effect on tape starting and stopping operations.

A further feature of the present invention resides in the provision of a tape-supplying means, per se, in the form of apparatus for driving a roll of record tape, or at least supplying the tape for feeding purposes. The supplying means is self-feeding when a tension is established in the tape by, for example, the application of a very slight drawing force to the tape, but is relaxed or non-feeding in the absence of the tension or slight drawing force. This feed is effected from the inside of the roll, thereby enabling entries on the tape to be read in the same order in which they were made without rewinding the tape, once it is removed from the machine in the form of a record. The roll is mounted about a plurality of shoes which are adjustable and which outline a core for accommodating the hollow interior of the roll. A plurality of driving rollers, usually in the form of cylinders having a rubber or felt covering to increase the surface friction, is interspersed among the shoes along the core outline, so that the rollers engage the innermost layer of tape and urge it in a direction to unwind it from the record roll. The inner end of the tape is extended about a portion of the circumference of one of the driver rolls and is directed generally inwardly of the record roll to an exit roller, which serves as a guide for the tape leaving the region of the supplying means. The driving rollers are normally continuously rotating but, in the absence of a drawing force applied to the end of the tape, do not cause the tape to be unwound because of slippage between the driving rollers and the innermost layer of tape of the record roll. However, when a drawing force or tension is applied to the end of the tape being removed from the record roll, as, for example, by the driving capstan, tensioning of the innermost layer causes the tape to hug the emerging driving roller more tightly, so that sufficient frictional engagement is established to cause the emerging roller to drive the tape to feed the tape from the roll. This driving engagement pulls the innermost layer of tape more tightly against the shoe adjacent to the emerging driving roller and consequently establishes driving engagement with a further one of the driving rollers, the tightening of the innermost layer of tape against the driving rollers being successive in a progressive manner evidenced by the second, third, and fourth inner layers of the tape (and so on) being drawn inwardly further to tighten the innermost layer of the tape against the shoes and the driving rollers as the tape is unwound.

A tape take-up reel is provided for storing the read tape in the form of a roll. A spool for receiving the tape is resiliently coupled to a flange which is rim-driven at a velocity insuring that the tape will be wound on the spool as fast as it is drawn through the reading station by the main driving capstan, slippage between the flange and the spool being evidenced when the tape is being stored on the spool at a speed slower than that at which the flange is driven.

The structure generally described above provides very reliable operation and enables rapid reading of a tape either continuously or intermittently. By locating the brake ahead of the reading station and the main driving capstan behind the reading station, both relative to tape movement, the tape being sensed or read is always under a degree of tension at the reading station due to the main driving capstan overcoming the residual drag imposed by the brake, so that any tendency for the tape to flutter is absolutely minimized. This feature is retained in a modified form of the invention wherein further control of the tape feed and take-up is attained through the use of one or more loops maintained in the tape under the supervision of a corresponding number of photo-cell-controlled auxiliary brakes. For example, if it is desired to exercise control over the tape in the region between the supplying means and the high-speed brake (prior to the reading station with respect to tape movement), an input tape loop means, including an input loop driving capstan and a photo-electrically-controlled first auxiliary brake, is interposed between the main high-speed brake and the tape supplying means, with the first auxiliary brake being effective to engage the tape emerging from the supplying means.

A light source is arranged to direct a beam of light across the tape loop to excite a photo cell when the tape loop is too short to interrupt the beam. Excitation of the photo cell releases the first auxiliary brake to enable the input loop driving capstan, operating in conjunction with the tape supplying means, to lengthen the loop of tape in the input tape loop. Upon lengthening of the tape loop, the beam of light is again interrupted to cause the first auxiliary brake to grip the tape and arrest its motion. The foregoing action persists in the well-known "hunting" fashion to provide a suitable loop to insure that tape is avialable for reading as required. The use of the input tape loop diminishes the driving conditions otherwise imposed upon the main driving capstan because, theoretically, the main driving capstan is required to drive only that portion of the tape between the bottom of the input loop and the driving capstan itself, which in actual practice reduces the effective length of the tape to be moved by the main driving capstan, further minimizing starting and stopping time.

It should be noted that the reading or sensing station supplies a signal, usually in accordance with a stop signal carried by the tape, to an electronic control circuit which operates the high-speed brake. When the main or high-speed brake is operated to increase the pressure applied against the tape to grip the tape and arrest the tape motion between the reading station and the input loop, the loop lengthens to interrupt the light beam passing across the input loop, which interruption operates the control circuit for the first auxiliary brake to arrest the motion of the tape between the input loop driving capstan and the tape supplying means. The loop size is not too critical; hence the performance requirements of the first auxiliary brake are not so exacting as the requirements for the high-speed brake, and it has been found that relays, suitably modified to permit the tape to pass between the armature and the pole pieces, adequately provide the requirements for the first auxiliary brake.

When desired, an output tape loop may be formed in the tape between the main driving capstan and the tape take-up to isolate these components effectively in the manner of the input tape loop just described. The ouput tape loop receives tape from the main driving capstan, and a second auxiliary brake is positioned between the tape take-up reel and the output tape loop to grip or arrest tape emerging from the output loop.

A light source is located to direct a beam of light across the output loop to excite a photocell when the tape loop is too short to interrupt the beam. Excitation of the photocell causes the second auxiliary brake to be effective to arrest the movement of the tape being taken up by the tape take-up real, the spool slipping with respect to its rim-driven flange, thereby allowing the main driving capstan to drive more tape into the output tape loop until the beam is interrupted and the second auxiliary brake is released to permit the take-up reel to wind tape by shortening the length of tape between the bottom of the output tape loop and the take-up reel spool. It may thus be appreciated that the tape take-up reel driving force is never effective against the main driving capstan because of the tape loop.

The electronic control circuit for operating the brake to arrest tape motion in response to tape-carried stop signals includes means controlled by the sensing or reading station upon sensing a stop signal to cause the brake to operate and arrest the tape in a predetermined position relative to the sensing means. The means to cause the brake to operate includes the brake-actuating coil and other components arranged to insure rapid actuation of the coil. The predetermined position in which the tape is arrested is preferably the tape position wherein the stop signal which caused the brake to operate is retained in the sensing or reading position, because, if the tape is immediately stopped upon the sensing of a stop signal, dead spaces are eliminated from the tape, and it can carry a maximum amount of information. The control circuit also includes means for releasing the brake and means to cause the releasing means to operate after the incidence of arresting tape motion. The means for releasing the brake is effectively a switch, such as a tube, which interupts the circuit of the brake-actuating coil. The means for causing the releasing means to operate is a circuit either locally or remotely controlled and in either event including a time delay, so that the releasing means operates only after the incidence of arresting tape motion plus the delay interval. If the tape reader is to read in a predetermined rhythm, then a predetermined amount of time delay may be incorporated in the circuit for causing the releasing means to operate, so that the reading and tape feeding operation becomes intermittent as to digits, transactions, or frames, or at least according to the distribution of the stop signals. In the alternative, the feeding apparatus may be made responsive to a call for more data issued by the utilizing device at random times, the tape being arrested for a different or the same period while the utilizing device is making use of the information previously read. In either event, it is desirable to incorporate a time delay effective at least for the interval of time required for the stop signal to move out of the sensing area or position upon the resumption of tape movement, so that a single stop signal will not lock the machine when such further tape movement is required.

A further feature of the invention resides in the provision of an interlock which may be used if desired. The interlocking provision is effected by means responsive to the sensing means for rendering the releasing means ineffective if the brake is applied in response to a stop signal, but the tape carries the stop signal beyond the sensing means.

If the tape should ever overthrow or carry the stop signal beyond the sensing area, the reader would sense a rapid transition from no signal through a stop signal to no signal, but the brake is relaxed and then operated and remains operated, since the transition from the stop signal to the absence of stop signal occurred in less time than the minimum time delay necessary to permit the stop signal to move out of the sensing area. It is this transition which establishes an electrical sequence at the sensing means, providing for the rendering of the releasing means ineffective to release the brake. The tape-feeding apparatus is actually locked until freed by an attendant, and this feature prevents the tape-carried information from becoming impaired.

Conventional magnetic tape records generally incorporate dead spaces or intervals to accommodate tape starting and stopping, thereby avoiding impaired information. When such conventional tapes are read, the interlocking feature is ordinarily unnecessary and can be omitted. However, this feature incorporated in a tape-feeding apparatus in accordance with the present invention enables the reading of magnetic record tapes which do not carry void or dead spaces to be effected with complete assurance that the information read will not be impaired. The feature is of course, quite important in optically-scanned tapes of the paper variety which are coded by business machines without regard to void spaces.

The foregoing outlined features and objects of the invention, along with others appearing hereinafter, will become more apparent from a reading of the following detailed description of the invention when viewed in the light of the accompanying drawings, wherein.

Figures 1, 7, 8, 9:
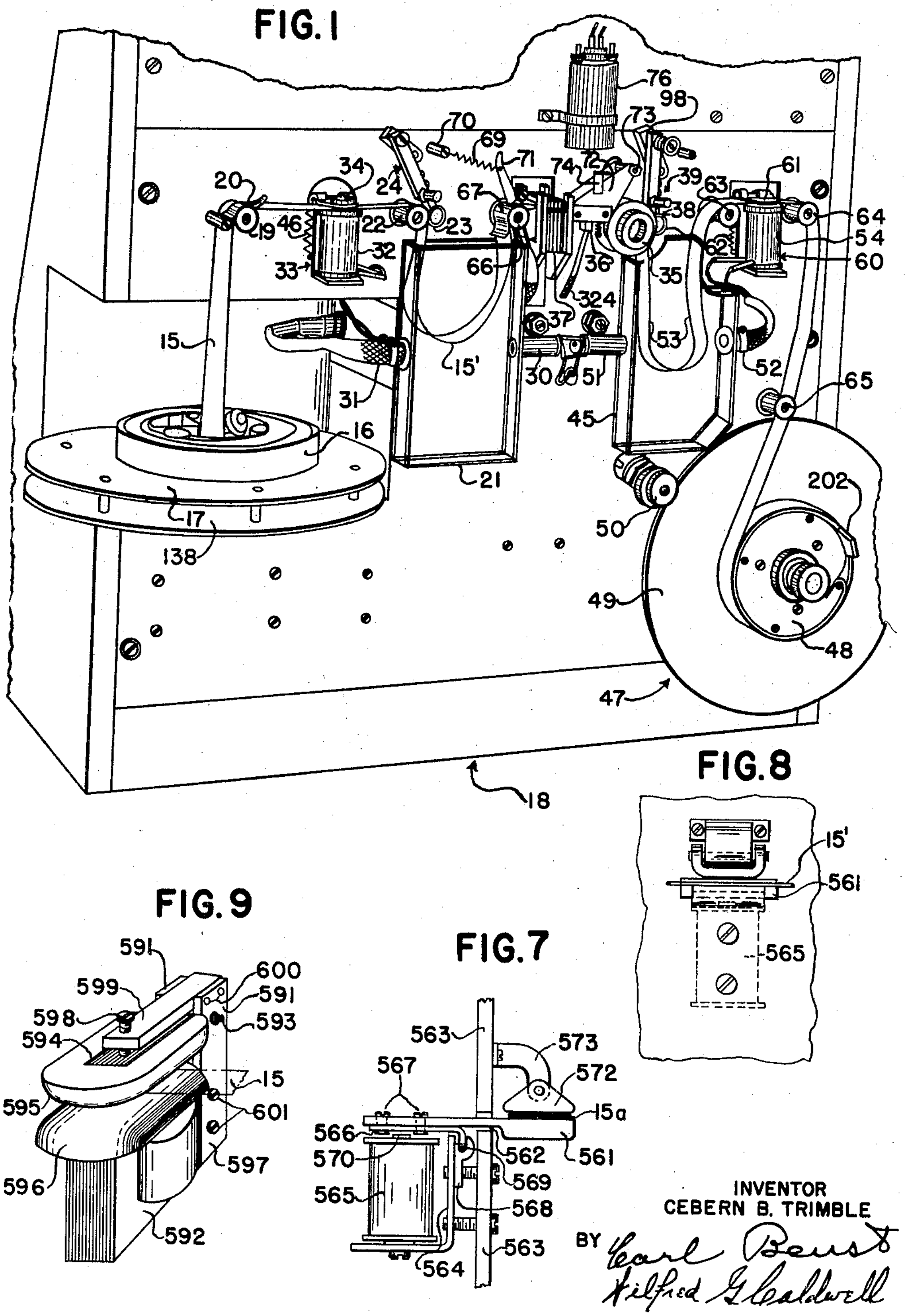
Fig. 1 is an isometric view of a tape-feeding apparatus including a reading station in accordance with the present invention.
Figures 2, 3:
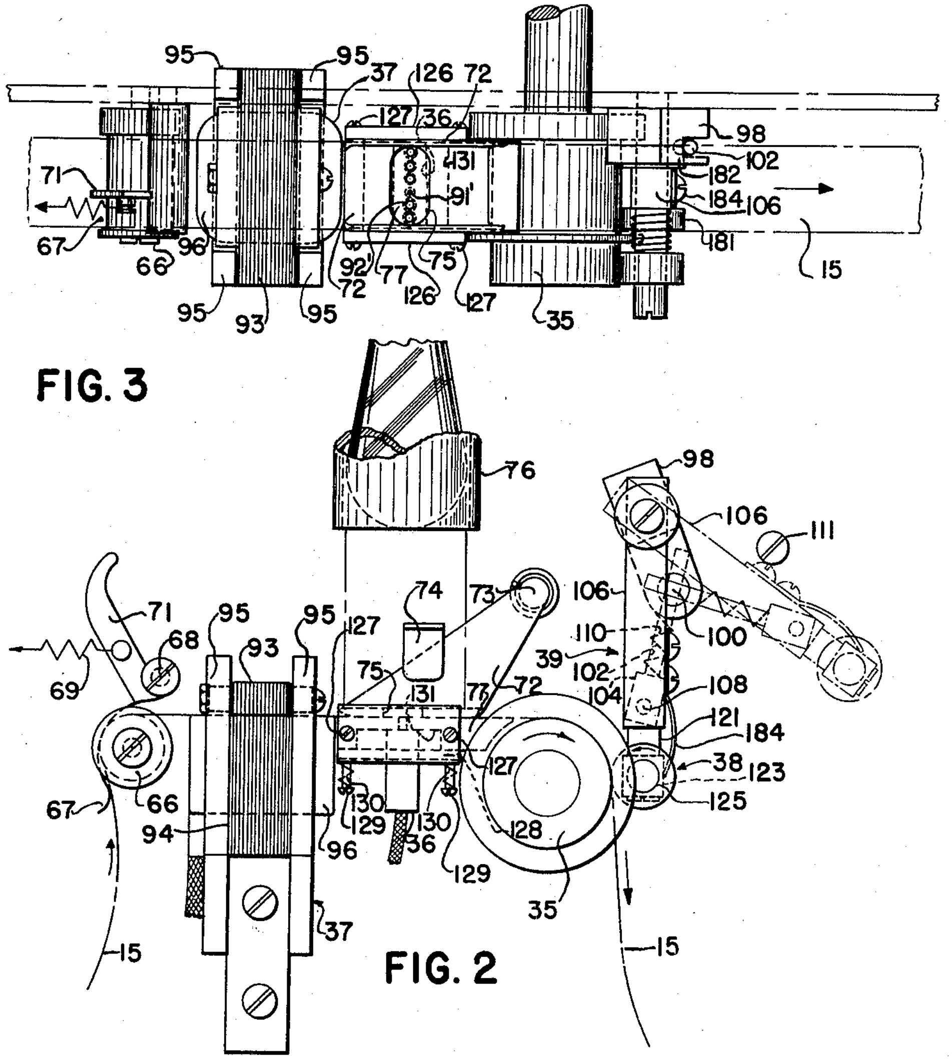
Fig. 2 is a view in side elevation of the main driving capstan and high-speed brake of the present invention oppositely disposed with respect to the reading station.
Fig. 3 is a view in plan of the structure of Fig. 2.
Figure 3A:
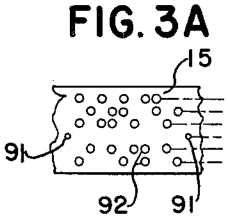
Figure 4:
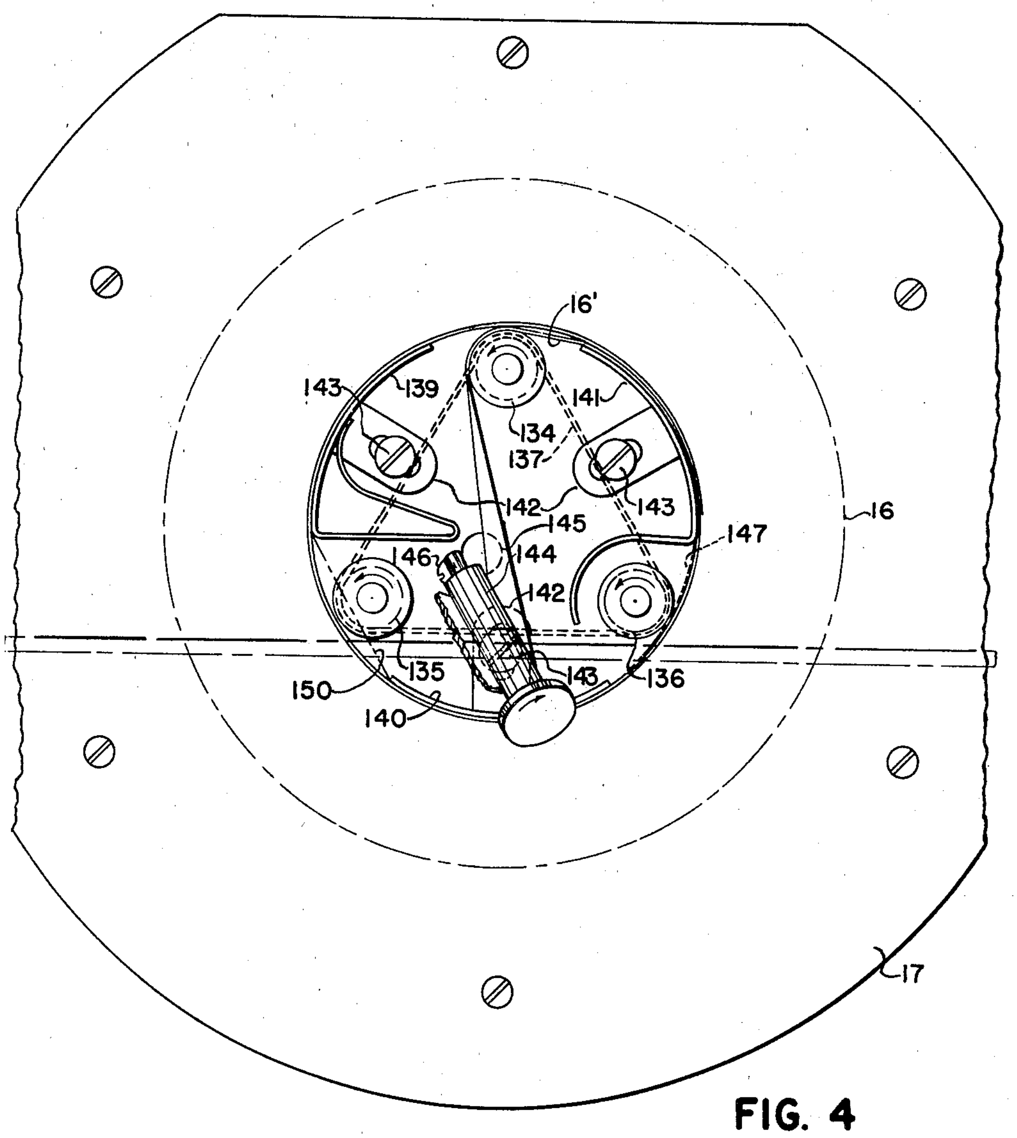
Figure 5:
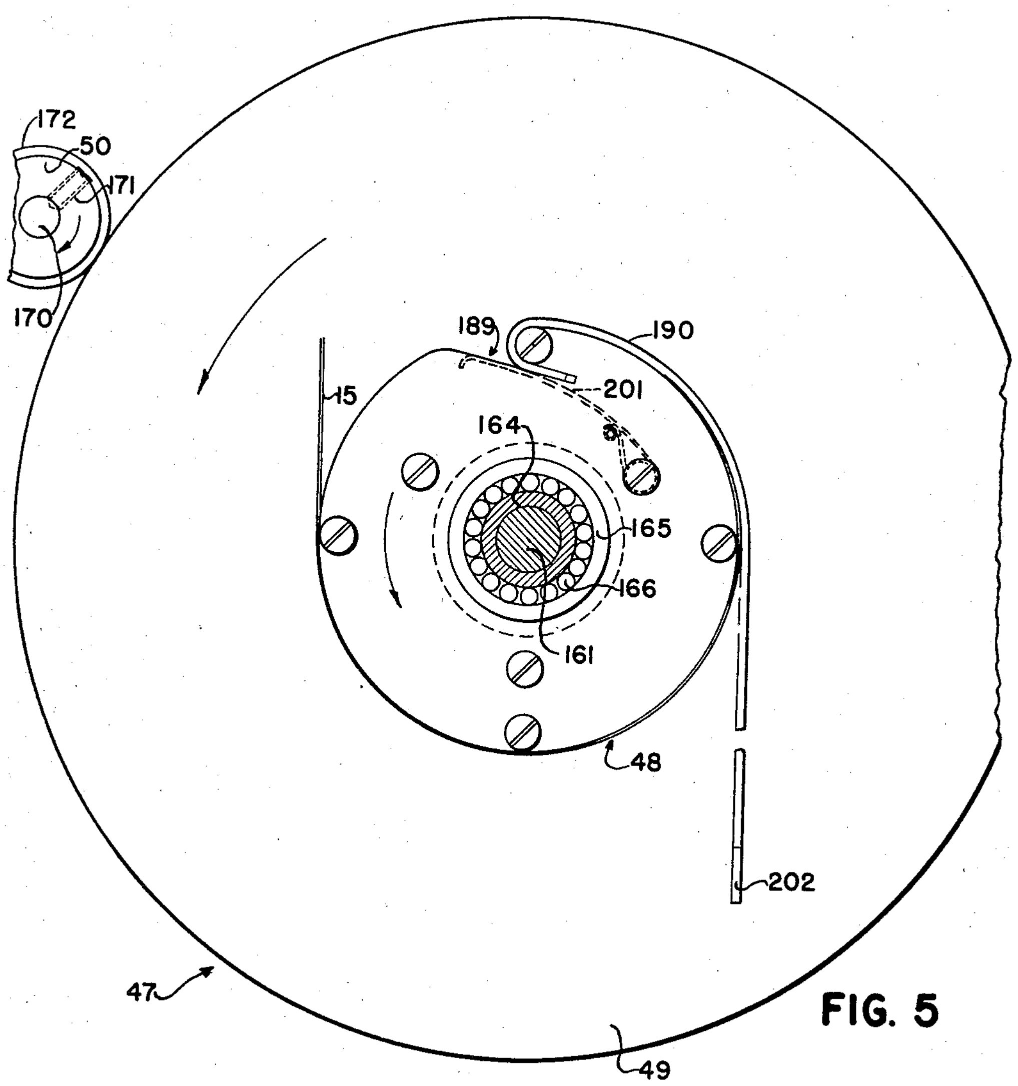
Figure 6:
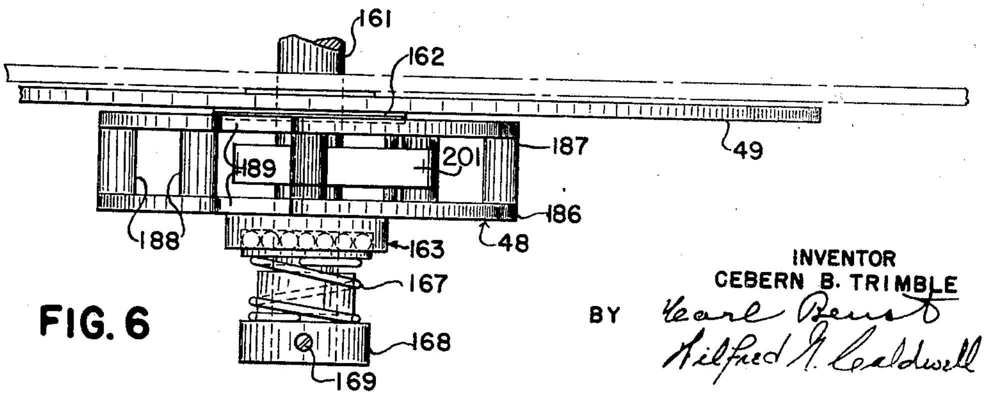
Figure 10:
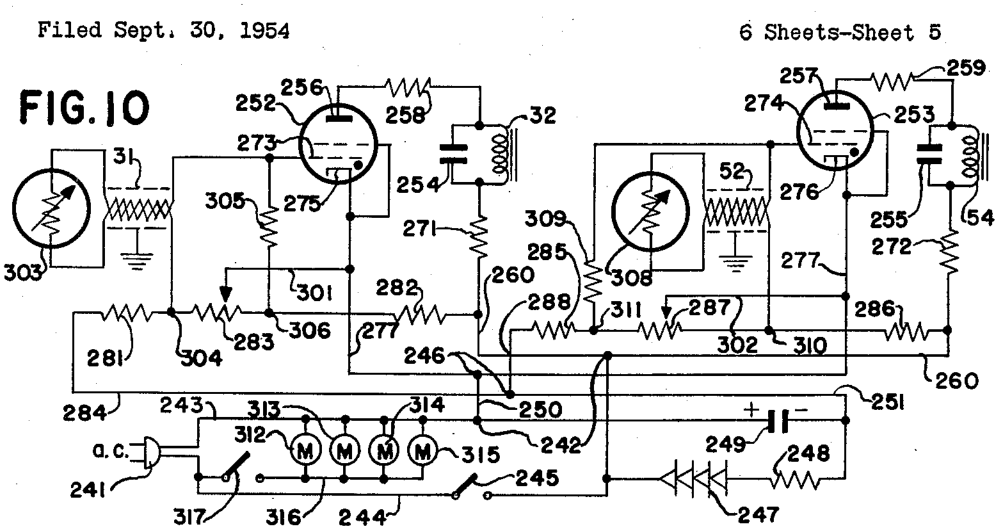
Figures 12, 13:
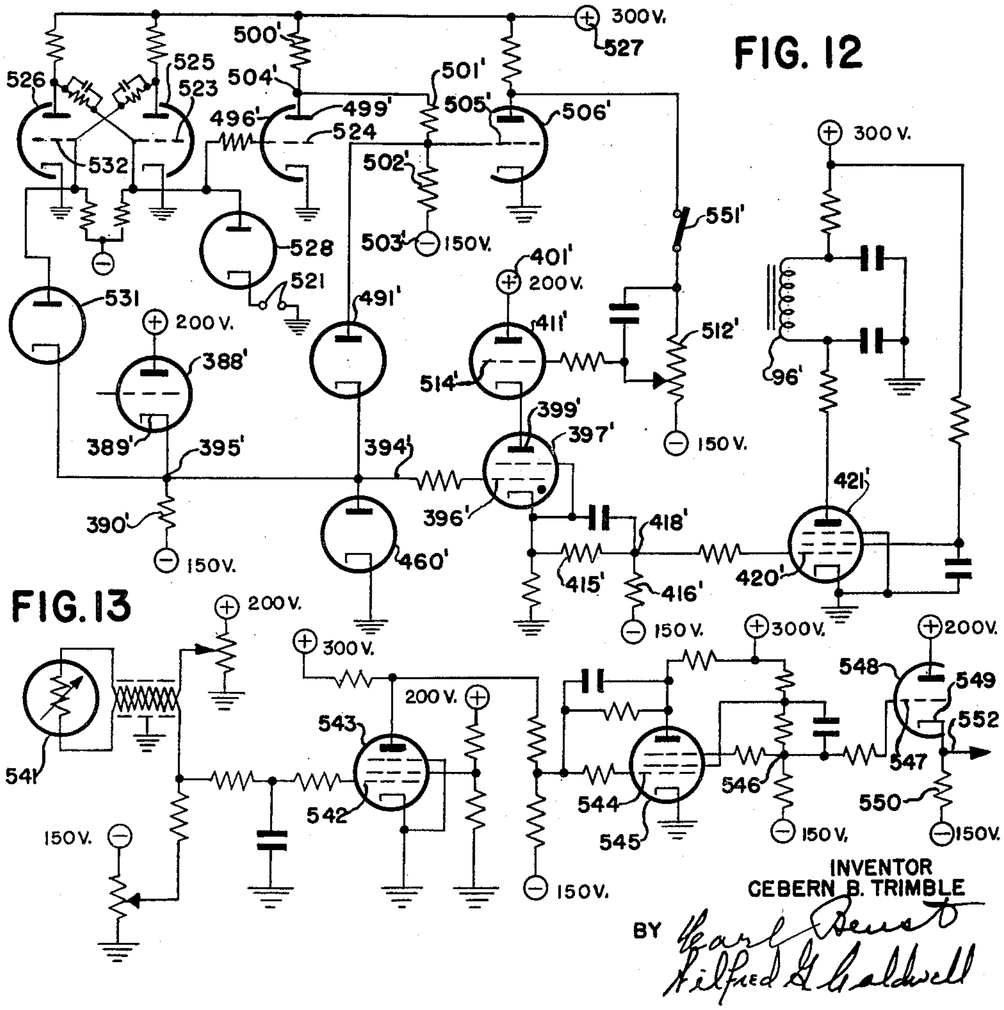
Figure 11:
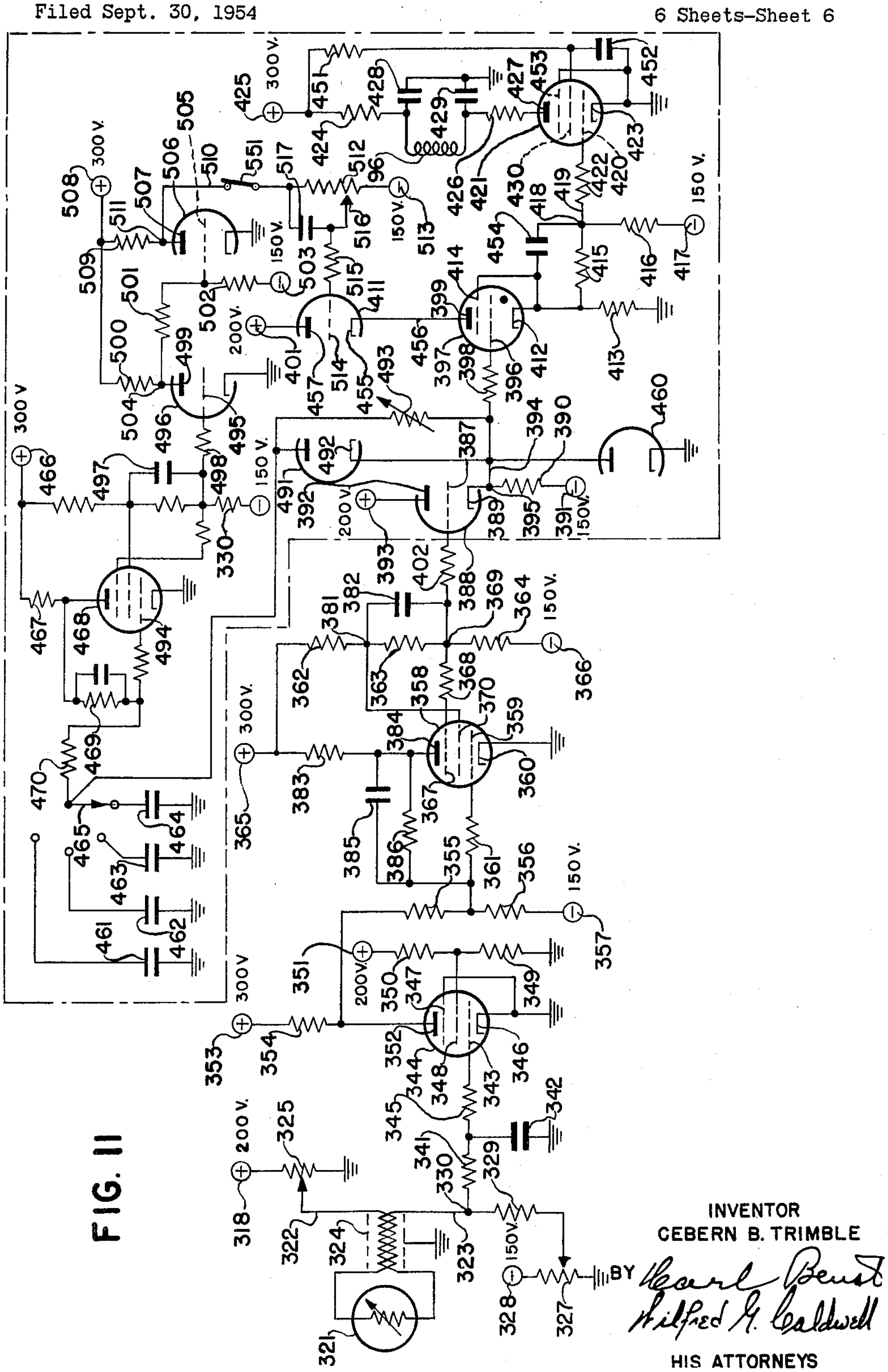

Fig. 3*a* shows a frame section of a record tape for optical scanning coded in an exemplary manner;

Fig. 4 is a view in plan of the tape-supplying means including a roll of tape adapted to be unreeled from the inside;

Fig. 5 is a view in elevation of the tape take-up reel, showing one means of attaching the tape thereto;

Fig. 6 is a view in plan of a portion of the structure of Fig. 5;

Fig. 7 is a view in side elevation of a preferred brake for use with magnetic tape;

Fig. 8 shows the structure of Fig. 7 in end elevation;

Fig. 9 is an isometric view of a modied type of high-speed brake suitable for use in the present invention;

Fig. 10 shows a suitable control circuit for the auxiliary brakes used in conjunction with the tape loop boxes;

Fig. 11 shows an electronic control circuit for operating the high-speed magnetic brake and effecting tape starting after a predetermined time delay;

Fig. 12 shows a modified control circuit similar to that shown in Fig. 11, but wherein the control is exercised remotely and at random by a utilizing device; and Fig. 13 shows a typical reading circuit for use in reading a single tape channel.

Referring now to the drawings, and particularly to Fig. 1, there is shown a record tape 15 emerging from the inside of a record roll 16, supported on a plate 17, in turn supported by a frame 18. The tape 15 passes between an idler 19 and a spring clip 20, which merely guide the tape from a vertical path to a horizontal path. The tape 15 is driven into an input tape loop box 21 by a continuously rotating input tape loop driving capstan 22, against which the tape is resiliently pressed by a roller 23 under spring pressure from a toggle mechanism 24. The lowermost portion 15' of the tape loop contained within the box 21 is illustrated slightly above the level of a light beam passing from a light source 30 to a photocell located within a shielded housing 31. When the tape loop lengthens to interrupt the light beam from light source 30, a brake coil 32 (Figs. 1 and 10) of a first auxiliary brake 33 is energized to pull its armature 34 downwardly against the tape 15 and press the tape against the brake pole piece, thereby arresting the tape motion, the tape slipping with respect to the continuously rotating driving capstan 22.

A continuously rotating main driving capstan 35 is disposed behind a reading station, generally indicated at 36, and a high-speed brake 37 with respect to the direction of tape travel. The main driving capstan engages the tape under the influence of a roller 38, resiliently maintaining the tape against the capstan 35 by way of a toggle arrangement 39, and drives it from the input tape loop box 21, through the reading station, and into an output tape loop box 45. When the lower portion 15′ of the tape loop disposed in the input loop box 21 is raised or removed from the path of the light beam from source 30 by main driving capstan 35, the photocell in housing 31 is again excited to relieve the power applied to brake coil 32. The armature 34 then applies only a slight drag to the tape under the pressure of a chatter-eliminating spring 46 of the first auxiliary brake, permitting the tape loop in box 21 to be extended or lengthened by driving engagement between the input loop driving capstan 22 and the tape. The lengthening and shortening of the loop in input loop box 21 is somewhat intermittent in the well-known "hunting" fashion. Under these circumstances, the input tape loop driving capstan 22 is responsible only for driving the tape 15 from the roll 16 effectively to the lowermost point 15′ of the loop in the input tape loop box, and the main driving capstan 35 only drives the tape from the lowermost portion of the loop in box 21 into the output tape loop box 45.

A tape take-up reel, generally indicated at 47, includes a spool 48 and a flange 49, which is rim-driven by a continuously-driven rim capstan 50. The spool 48 is resiliently maintained in frictional engagement with the flange 49, so that slippage can occur between the spool and the flange when the tape is arrested. The spool receives the tape from the output tape loop box 45 under the supervision of a control circuit similar to that described in connection with the input tape loop box 21. The output tape loop box 45 is provided with a light source 51, similar to the light source 30, and a shielded housing 52 containing a photocell. In the usual operation of the control, the cell is not activated by a light beam from the source 51 because the output tape loop 53 normally interrupts the light beam.

When the photocell in housing 52 is energized by the light beam from source 51 due to a shortened tape loop 53, a brake coil 54 (Figs. 1 and 10) is energized to activate a second auxiliary brake generally shown at 60 in Fig. 1, thereby increasing the pressure applied by its armature 61 to the tape to grip the tape and arrest the motion of the tape between the output loop box 45 and the take-up reel 47. Application of the brake 60 causes the tape loop to lengthen into, for example, the position shown in Fig. 1. The beam of light from source 51 is thus interrupted, and the coil 54 of the second auxiliary brake 60 is de-energized to permit the armature 61 to relieve the pressure applied to the tape except for that occasioned by the chatter-eliminating spring 62, thereby permitting the output loop 53 to shorten. The lengthening and shortening of the tape loop 53 insures isolation between the take-up reel 47 and the main driving capstan 35.

A pair of idlers 63 and 64, each preferably having spaced-apart flanges to accommodate the tape 15, serve merely as guides for the tape passing out of the output loop box 45, through the second auxiliary brake 60, and onto the take-up reel 47 by way of a further guide or idler 65 of similar configuration. Likewise, an idler 66 guides the tape 15 from the input loop box 21 into the high-speed brake 37. A spring clamp 67 is pivoted about the axis 68 (Fig. 2), and a spring 69, connected between a post 70 fixed to the frame 18 and an arm 71 of the clamp 67, holds the tape against the idler 66, thereby providing an even tape flow into the high-speed brake 37, the clamping pressure being merely sufficient to insure a turning of the tape.

Since the first auxiliary brake 33 and the high-speed brake 37 preferably apply slight pressure against the tape at all times, any drag imposed by the spring clamps 20 and 67, effective at the idlers 19 and 66, respectively, is not detrimental to the tape feeding, since the idlers are located ahead of the respective brakes. In each instance, the idlers are free to rotate, and, in the case of the idlers 63, 64, and 65, the tape is completely free to move relatively thereto, so that, in general, the idlers may be regarded as mere guides and their mass neglected in connection with tape starting and stopping.

A further element which applies a very slight pressure to the tape is the pressure shoe 72, located between the high-speed brake 37 and the main driving capstan 35. The only pressure exerted by the pressure shoe 72 is due to its weight, it being pivoted about the axis 73 and provided with a tab 74 to facilitate lifting it away from the path of the tape for purposes of threading.

As is best seen in Figs. 2 and 3, the pressure shoe 72 is provided with an aperture 75, adapted to admit light from the reading light source 76 to the actual reading unit 36 by way of an aperture plate 77, over which the tape passes. The light source 76, the aperture plate 77, and the actual reading unit 36 constitute the reading or sensing station adapted to read a perforated paper tape coded as shown, for example, in Fig. 3*a*. The circuit of Fig. 13 is regarded as a typical reading circuit for a single channel of the tape 15. As shown in Fig. 3*a*, the tape has five separate channels, each extending longitudinally of the tape, for representing data and has a stop signal channel. The stop signals are represented by the smaller perforations 91 and the digits by the combinations of transversely-alined larger perforations 92 in various selected ones of the five channels. The fragment of tape represented in Fig. 3*a* portrays one frame including a stop signal for that frame and a stop signal for the preceding frame. The particular frame is illustrated with a capacity of ten digits, but, as has been previously mentioned, the frames are variable in capacity, depending upon the transaction or other quantity which they represent, the frames varying from a single digit to ninety or more digits.

If it is desired to read a tape of the magnetic variety, the reading station is merely altered to substitute, for the optical arrangement shown, a conventional magnetic pick-up, usually incorporating as many individual heads as there are channels to be read, and otherwise following well-known practices. The use of magnetic tape in the tape-reading apparatus of the present invention requires one other modification, in the nature of a brake for gripping the tape. Such a brake is shown in Fig. 7 and will be described later. The ensuing description sets forth the invention particularly in connection with its applicability as a tape-feeding apparatus for record tape of the perforated variety.

Considering now Figs. 2 and 3, the main driving capstan 35 and the high-speed magnetic brake 37 are shown in operative relationship with an intermediately-disposed reading station of the optical variety, showing the tape feeding and reading portion per se of the structure of Fig. 1. This structure not only is capable of use in the arrangement shown in Fig. 1 but is equally capable of being used when it is desired to read an endless loop of coded tape, or to read a tape without regard to its source of supply or ultimate storage, as, for example, the reading of a tape which is to be discarded. The tape 15 is shown entering the mechanism at the left of Fig. 2, between the spring clamp 67 and the idler 66, from which it passes between the armature 93 and the main laminations 94 of the high-speed magnetic brake 37. The armature 93 rests on the tape and is retained in position by a plurality of guides 95, which extend upwardly of the main laminations 94. The weight of the armature 93 applies a slight pressure to the tape 15 at all times, resulting in a slight drag, which is overcome by the main driving capstan 35 in cooperation with the roller 38. This drag insures that the tape will be taut as it passes the reading station. Energization of the coil 96 of the high-speed brake 37 causes the armature 93 to increase the pressure applied to the tape, thereby gripping the tape and arresting its motion, the main driving capstan 35 then slipping with respect to the stationary tape.

The toggle arrangement 39, which causes the pressure roller 38 to force the tape 15 into driving engagement with the main driving capstan 35, includes a stationary bar 98, fixed to the frame 18 (Fig. 1) to provide a pivot axis at 100, by a pin or the like, for a shaft 102, which carries an enlarged head 104. The head 104 of the shaft 102 is pivotally attached to a moveable support 106, along the axis 108. A spring 110, acting between the fixed bar 98 and the head 104 of the shaft 102, causes the movable support 106 to remain in the selected position of either of its two extreme positions, illustrated in Fig. 2. The engaging position, shown in solid outline, permits tape drive, whereas the upper right-hand position, illustrated in phantom outline with the movable support 106 biased against a stop 111, facilitates tape threading. A stub 121 depends from the main support 106 to carry a bearing housing 123, which contains an axle 125, supporting respectively on its ends a wheel 181 and a wheel 182, jointly adapted to exert pressure against the tape for producing driving engagement with the main driving capstan 35. A leaf spring 184 is secured to the supporting member 106 and extends behind the bearing housing 123 to provide a stabilizing influence, tending to maintain even engagement of the wheels 181 and 182 with the tape. The component of pressure applied by the wheels 181 and 182 is directed only slightly inwardly of the driving capstan 35, enabling slippage between the capstan and the tape immediately upon operation of the brake. Accordingly, the portion of the tape 15 between the brake 37 and the main driving capstan 35 is always under tension, thereby avoiding ripples in the tape and flutter in general. Even when the brake is operated, the tape is restrained from buckling or rippling by the action of the driving capstan 35 and the pressure wheels 181 and 182.

To obtain the maximum benefit from these conditions, the reading station is preferably located between the high-speed brake 37 and the main driving capstan 35. In the illustrated optical arrangement, the actual reading unit 36 contains six miniature photocells of the variable resistance type, each having a sensitive area of germanium or lead sulfide. The latter has a peak response in the region of 11,000 Angstroms, which matches the peak output of tungsten lamps, such as those employed in the light source 76. Photocells of the lead sulfide type having suitable electrical characteristics are marketed by Lectro-Max, Inc., under the type designation LX–121. The outside dimensions are, however, of the order of 0.25 inch, but cells having maximum lateral dimensions of 0.1 inch are obtainable by special order. Also, Sylvania Electric Products Inc. markets a suitable germanium cell having an outside dimension of 0.095 inch under the type designation IN77*a*.

Cadmium sulfide cells exhibit little drift, since they are operated in the region of the X-rays rather than being sensitive to infra-red rays, and accordingly are not influenced by heat. For these reasons, the cadmium cells are quite well suited for use in the photocell housings 31 and 52 in connection with the loop supervisory circuits. These cells are marketed by the Lectro-Max Company under the type designation LX–123. The usable list of photocells also includes others generally classifiable as miniature type cells because of their overall dimensions, the diameters measuring less than 1/10 inch. Since the tape width is generally 3/4 inch or over, six cells can be fitted transversely of the tape to read the five digit channels and the stop channel. The photocells are contained in the reading unit 36 in such a way that the cells responsive to the channel information are disposed beneath the apertures 92' of aperture plate 77 (Fig. 3), the reading circuit for these cells being represented in Fig. 13, and the cell responsive to the stop signals is disposed beneath the stop aperture 91', the circuit controlled by this cell being represented in Fig. 11.

The aperture plate 77 (Fig. 2) provides a pathway for the tape from the high-speed brake 37 to the main driving capstan 35. The vertical flanges 126, secured along the sides of the plate 77 by the screws 127, aid in confining the tape to the pathway. The reading unit 36 is secured in a bottom plate 128 adapted to abut the under surface of the aperture plate 77, being retained in this position by the screws 129 fitted with tension springs 130. The aperture plate 77 includes a milled slot 131, in which the reading unit 36 is mounted to locate the cells in immediate proximity to the tape 15 passing over the upper surface of the aperture plate 77. The light source 76 is continuously operating to direct light onto the tape 15 and through the apertures 91' and 92' of the aperture plate 77 when the tape digit apertures 92 and the tape stop signal apertures 91 coincide with the reading apertures.

In Fig. 4 is illustrated the tape-supplying mechanism, which is shown generally in Fig. 1. This mechanism not only is capable of supplying tape via a tape loop, as shown in Fig. 1, but also is suitable for introducing tape directly to the idler 66 of Fig. 2. A tape-feeding driver 134 and a pair of auxiliary drivers 135 and 136 are supported above the plate 17 (Fig. 1) in spaced-apart relation. The drivers are of the roller type, being cylinders preferably covered with a layer of rubber or other friction material to enable effective engagement with the innermost layer of tape 16' of the tape roll 16. The drivers are continuously rotating, being coupled together by a driving belt 137 located beneath the plate 17 and above the plate 138 (Fig. 1).

A plurality of arcuate shoes, herein represented as the three shoes 139, 140, and 141, is also supported from the plate 17 in mutually-spaced-apart relation to outline a core adapted to accommodate the roll of record tape 16. The shoes include inwardly-protruding lugs or projections 142, each slotted to accommodate adjusting screws 143. The shoes may be moved radially to hold the roll of record tape with its innermost layer 16' normally out of driving engagement with the drivers 134, 135, and 136. The drivers are arranged with respect to the shoes in such a way that a portion of the periphery of each is, respectively, located within segments of the circular core defined by lines, such as the broken line 150, extending between opposed shoe extremities. The emerging tape extends over a portion of the periphery of the tape-feeding driver 134 and is directed inwardly of the core outline to an exit roller 144, obliquely located with respect to the plane of the tape roll 16, with its innermost end secured to an upright post 145, projecting out of the plate 17, by means of a screw 146.

The exit roller 144 merely serves as a guide to direct the tape outwardly of the plane of the tape roll 16, which direction (looking at Fig. 1) is vertical, to the idler 19. In order to remove the tape from the roll, a slight drawing force is applied to the emerging tape, effective in the direction of unwinding, to tension the tape or take up the slack in the tape up to the point of its engagement with the tape-feeding driver 134, so that the tape is brought into driving engagement with a portion of the periphery of the tape-feeding driver 134, which driver then starts the tape feeding from the roll. Once feeding engagement is established with the driver 134, the innermost layer of tape 16' is brought to bear against the shoes 140 and 141 and tends to occupy a position similar to line 150. This will force the tape into engagement with the periphery of the driver 136, the tape being tautly drawn between the arcuate shoes 140 and 141 to occupy a position generally indicated by the dotted line 147. Upon establishment of driving engagement with the auxiliary driver 136, the tape is caused ot be tautly drawn between the arcuate shoes 139 and 140 to establish driving engagement with the auxiliary driver 135. The pressure of the innermost layer of the roll against the drivers 134, 135, and 136 causes the drivers to feed the tape to unwind it from the roll. The pull exerted by the driver 135 in turn draws the next innermost layer of tape on roll 16 inwardly to increase the tape pressure effective against tape-feeding driver 134, the increased effective driving engagement being successively introduced to auxiliary drivers 136 and 135 by the second-innermost layer of tape on roll 16. This process is continued, causing progressive layers to increase the effective driving engagement, resulting in a force maintaining the tape roll 16 in a tight configuration while supplying tape from the inside of the roll in response to a tension or call for tape.

One of the most important advantages of an inside tape-feeding apparatus, such as that shown in Fig. 4, resides in feeding the tape to the reader in the same order in which entries were made thereon without requiring a rewinding of the roll. A further advantage offered by the tape-supplying apparatus of Fig. 4 resides in the elimination of the effect of the mass of the supplying means from the tape feed on the high-speed starting and stopping of the tape. The tape-supplying means, which is power-operated, is immediately responsive to the call for tape in automatically unwinding tape from the reel. The tension established in the tape (by the auxiliary driving capstan 22 in the apparatus shown in Fig. 1 or by the main driving capstan 35 if only the components of Fig. 2 are employed) need only be sufficient to eliminate the slack in the tape, thereby drawing it into engagement with the tape-feeding driver 134. In the alternative, a signal or call for tape could result in the pressure of a finger or pressure roller against the tape-feeding driver 134 to provide the driving engagement between the tape and the driver 134.

The tape take-up reel 47 (shown in detail in Figs. 5 and 6) is also a compatible component of the high-speed tape-feeding apparatus of Fig. 1 in that its moving mass is substantially isolated from the tape feed and accordingly does not interfere with high-speed tape feed nor affect the rapid starting and stopping of the tape. A supporting shaft 161 carries the flange 49 and the spool 48, on which the tape is stored. The flange 49 is freely fitted or otherwise journalled on the supporting shaft 161, and the spool 48 is left free to move relatively to the shaft 161, which is fixed. The opposing surfaces of the flange 49 and the spool 48 accommodate a disc of felt 162, which provides a friction surface capable of transmitting motion from the flange 49 to the spool 48. A ball bearing 163, having an inner race 164 and an outer race 165 with the balls 166 therebetween, is located on the shaft 161 adjacent to the outer surface of the spool 48 and is urged against the spool by a spring 167 retained on the shaft 161 through abutting engagement with a collar 168 pinned to the shaft by a screw or pin 169.

The rim driving capstan 50 is rigidly fixed to a driving shaft 170 by a pin 171 and includes a peripheral layer 172 of rubber or the like for insuring good driving engagement with the flange 49. The flange is continuously driven by the rim capstan 50, and, in the absence of braking applied to the tape, the spool 48 is driven to receive tape through the engagement afforded by the felt disc 162. However, when the tape is arrested, as by operation of the second auxiliary brake 60 (Fig. 1), slippage occurs between the felt disc 162 and the flange 49, so that the spool 48 comes to rest.

The tape 15 may be attached to the spool 48 of the pick-up reel 47 in any conventional manner. However, the instant invention utilizes a novel method and means for attaching the tape to the spool, which means also permits the wound roll of tape to be easily removed from the spool. The discs 186 and 187, spaced apart by the studs 188 and constituting the spool 48, include peripheral notches 189 adapted to receive an end of a strip 190 of felt or the like retained in the notches by a spring clamp 201. When the tape is to be attached to the spool, the end of the tape is located beneath the felt strip, as is shown in Fig. 5, and the spool 48 is rotated in the direction of the arrow appearing thereon to wind the strip 190 over the tape and then the tape over the strip. A tab 202, which extends outwardly of the tape being wound upon the spool 48, is included on the strip 190. When it is desired to remove the roll of tape accumulated on the spool 48, the tab 202 is pulled outwardly of the spool to remove the strip from between the first two turns of the roll. Due to the thickness of the strip 190, its removal from between the inner turns of the roll in effect increases the inner diameter of the roll and provides clearance sufficient to enable the roll of tape to be easily lifted off the spool.

The effective moving mass of the spool 48 increases as tape is accumulated, but in either of the arrangements of Figs. 1 and 2 the spool inertia is ineffective to influence tape starting and stopping at the reading station.

In the arrangement of the invention illustrated in Fig. 2, assuming that the tape expelled by the main driving capstan 35 is being accumulated by the take-up arrangement of Figs. 5 and 6, when the main brake 37 arrests the tape 15 the energy of rotation of the spool 48 and the thereby-supported tape is dissipated in slightly displacing the pressure roller 38 away from the driving capstan 35 against the force of the spring 110 (Fig. 2).

In the arrangement of Fig. 1, the energy of rotation of the spool 48 and the thereby-supported tape is dissipated at the second auxiliary brake 60 in the form of heat developed by the tape-to-armature and pole piece friction, the output loop serving to isolate the take-up reel 47 from the reading station by providing slack tape, when necessary, for stopping of the spool 48. If the second auxiliary brake 60 is energized when the main brake is ordered to arrest the tape, the take-up reel is also arrested, so its energy of rotation is zero. However, if the main brake 37 is applied when the output tape loop 53 is long enough to interrupt the light to the photocell in the shielded housing 52, the second auxiliary brake 60 is permitting the take-up reel to receive tape, so its energy of rotation is not zero. The effect of stopping the tape at the reading station but permitting the take-up reel to rotate is to shorten the output tape loop 53, so that the photocell contained in the shielded housing 52 is energized to apply the second auxiliary brake 60 before the take-up reel can influence the tape at the reading station.

The photocell circuit for controlling the second auxiliary brake 60 is shown in Fig. 10, along with a similar arrangement for controlling the first auxiliary brake 33. An electrical plug 241 provides a common A. C. supply at terminal points 242 by way of input leads 243 and 244, the latter of which includes a switch 245. A D. C. source of supply is obtained between the terminal points 246 by way of a metallic rectifier 247, connected in series with a resistor 248, of 47 ohms, provided as a protective means to decrease the peak starting current, and a condenser 249, of 20 microfarads, to provide a filtering action, the combination being connected across the A. C. input leads 243 and 244. A pair of leads 250 and 251 extends from opposite sides of the condenser 249 to the D. C. terminal points 246, the lead 250 being connected to the positive side of the D. C. source and the lead 251 to its negative side.

A pair of gaseous discharge tubes 252 and 253, of, for example, the 2D21 variety, is employed to control the energization of the brake coils, the tube 252 controlling the coil 32 of the first auxiliary brake 33 and the tube 253 controlling the coil 54 of the second auxiliary brake 60. The brake coil 32 is shunted by a condenser 254, of four microfarads, and brake coil 54 is shunted by a condenser 255, of like size, the parallel combinations being, respectively, connected to the anodes 256 and 257 of the gas tubes 252 and 253 by way of parasitic suppressor resistors 258 and 259, of approximately 100 ohms each. The A. C. anode supply circuit extends from A. C. terminal point 242 to the condenser-brake coil circuits by way of common lead 260 and a pair of series limiting impedances, herein illustrated as the resistor 271, of 1,500 ohms, in series with the condenser-brake-coil 32 circuit and the resistor 272, of like magnitude, in series with the condenser-brake-coil 54 circuit. Thus, when A. C. input lead 244, connected to A. C. terminal point 242, is positive, the gas tubes 252 and 253 may conduct, depending, of course, upon the potential of their control grids 273 and 274 relative to their cathodes 275 and 276, but, when the A. C. supply reverses, upon the next half cycle, so that this terminal point 242 becomes negative, the tubes 252 and 253 are either off or extinguished.

The cathodes 275 and 276 of the gaseous discharge tubes are connected in common by way of lead 277 and to the D. C. output terminal 246, which is in direct connection with one of the A. C. output terminals 242, via lead 250. A voltage divider for the first auxiliary brake circuit includes a pair of fixed resistors 281 and 282, of 27,000 ohms each, in series with a potentiometer 283, of 25,000 ohms, the series combination being connected by way of lead 260 to the isolated one of the A. C. terminal points 242 and by way of lead 284 to the isolated one of the D. C. terminal points 246. The second auxiliary brake circuit includes a similar voltage divider, comprising fixed resistors 285 and 286, each of 27,000 ohms, connected in series with a potentiometer 287, of 25,000 ohms, the voltage divider being connected in parallel with the first-mentioned voltage divider through lead 288, which extends to the isolated D. C. terminal point 246, and lead 260, which connects to the isolated A. C. terminal point 242. The cathodes 275 and 276 of the gaseous discharge tubes 252 and 253 are respectively tapped into the potentiometers 283 and 287 by way of leads 301 and 302.

A photocell 303, of, for example, the cadmium-sulfide type before mentioned, is contained in the shielded housing or cable 31 (Figs. 1 and 10) and is connected to the control grid 273 of the gas tube 252 and to the junction point 304 between the fixed resistor 281 and the potentiometer 283. A grid resistor 305 is connected between the control grid 273 of the tube 252 and the junction point 306 between the potentiometer 283 and the fixed resistor 282. The photocell 303 is of the photo-resistive variety, the "dark resistance" of which is considerably higher than the "light resistance." Although the tape 15 is translucent to a degree, the input loop contained in box 21 (Fig. 1) imposes a double thickness between the light source 30 and the photocell 303 contained in the shielded housing 31, and, accordingly, when the tape interrupts the light beam from light source 30, the photoresistance of the cell changes from approximately one third of a megohm to a megohm. The grid resistor 305 has a value equal to the "dark resistance," so that the potential of the control grid 273 of tube 252 is the same as the potential at the mid-point of potentiometer 283 when the photocell is dark.

Under these conditions, and when A. C. lead 244 is positive, the gaseous tube 252 conducts to energize brake coil 32, causing the first auxiliary brake 33 (Fig. 1) to be applied to arrest the tape coming into the input loop box 21. Then, as the tape loop in the box 21 is shortened by the main driving capstan 35, for example, to the position shown in Fig. 1, the light beam from source 30 again strikes photocell 303 to cause its resistance to decrease to one third of a megohm, which, by resistive voltage divider action, decreases the potential on control grid 273 relative to cathode 275 to prevent the gaseous discharge tube 252 from conducting once the A. C. supply voltage reverses to extinguish it, thereby de-energizing brake coil 32 to release the first auxiliary brake 33.

When the circuit of Fig. 10 is to be placed into operation, the switch 245 is closed to complete the A. C. supply circuit and permit the filter condenser 249 to charge. Closure of the switch 245 also establishes filament supply for the tubes 252 and 253, the filament supply being conventional and therefore not represented. Also, the four-microfarad condenser 254, connected in shunt with the brake coil 32, is charged by plate current, so that the brake coil 32 will be maintained energized during the half-cycle intervals when the alternating current polarity is such that lead 244 is negative and lead 243 is positive, the condenser being charged in the opposite polarity. Consequently, although the gaseous discharge tube 252 is extinguished on alternate half-cycles of the A. C. supply wave, the condenser 254 holds over sufficiently to prevent chatter in the relay or first auxiliary brake 33 (Fig. 1). This arrangement enables a practical inexpensive working circuit, requiring no separate means to extinguish the tube 252. However, since the charge on condenser 254 may hold over for an interval corresponding to three or four cycles of the A. C. supply frequency subsequent to the extinguishment of tube 252, it is apparent that the auxiliary brake will not arrest the tape motion in an interval of micro-seconds but rather in fractions of a second. Such a speed of response is entirely adequate for purposes of control of the tape loops, because, whether the loop is increasing or decreasing in length, an additional one-half-inch increment is of no importance.

The grid circuit of the gaseous discharge tube 253, which is responsive to a photocell 308, of the same type as photocell 303 and positioned within the shielded housing or cable 52, is similar to the grid circuit of the gaseous discharge tube 252, except that the positions of the grid resistor 309 and the photocell 308 have been interchanged. The photocell connects from the grid 274 to the junction point 310, located between the fixed resistor 286 and the potentiometer 287, and the grid resistor 309 connects between the grid 274 and the junction point 311, between the fixed resistor 285 and the potentiometer 287. Since it is desired to energize the brake coil 54 when the loop 53 (Fig. 1) shortens sufficiently to permit photocell 308 to be energized, the cathode tap 302 is moved toward the right end of fixed resistor 287 to apply a positive potential to the cathode with respect to the reference level of zero potential established at the grid 274 when the resistance of the photocell approximately equals the resistance of the grid resistor 309. When the tape loop 53 shortens sufficiently to permit light from source 51 to energize photocell 308, its resistance drops to approximately one third of a megohm, thereby raising the potential of the grid 274 with respect to the cathode 276 to permit conduction in gaseous discharge tube 253, which energizes brake coil 54 of the second auxiliary brake 60. The brake remains applied as long as the grid potential is more positive than the cathode potential because the condenser 255 holds over sufficiently between corresponding half-cycles of the A. C. supply wave to maintain the coil 54 energized when the A. C. polarity changes. However, when the tape loop 53 lengthens sufficiently to interrupt the beam of light from source 51, the photocell again reverts to its "dark resistance," comparable in magnitude to the grid resistor 309, to lower the potential of the grid 274 with respect to the potential of the cathode 276, so that, as soon as the polarity of the A. C. wave changes, with lead 244 becoming the negative side, the tube 253 is extinguished, and the brake coil 54 is de-energized to release the second auxiliary brake 60. As was earlier mentioned, in the case of both of the tape loops, the well-known hunting action takes place, so that the brakes 33 and 60 are inermittently activated and de-activated, with the actual variation in tape loop length being confined to approximately one inch.

In Fig. 10 there is also illustrated a typical motor circuit, including the motors consecutively numbered from 312 to 315, adapted to drive, respectively, the tape supply main driver 134 and the auxiliary drivers 135 and 136 (Fig. 4) driven therewith, the input tape loop capstan 22, the main driving capstan 35, and the rim driving capstan 50. The motors in general have power ratings between 1/50 and 1/40 horsepower at 1,725 to 1,760 R. P. M.

The motors are connected in parallel between one side of the A. C. line 243 and the other side of the A. C. line via conductor 316 and switch 317, the closure of which energizes the motors simultaneously. It should be apparent that a single driving motor will suffice to supply the continuous drive utilized throughout the machine of Fig. 1, such a single motor replacing the motors consecutively numbered from 312 to 315 by being connected through suitable connections for developing driving speeds at the various shafts as indicated hereinafter.

In order to bring out the relative speeds at which the various drives operate, a specific example of the drives for reading data at 300 digits per second will be described. It is to be understood that this speed is merely chosen as illustrative and is not to be considered as the maximum speed possible. When other tape speeds are desired, suitable adjustments in the relative speeds of the drives may be made to preserve the relationship necessary for the proper operation of the apparatus.

If it is desired to read digits at the rate of 300 a second, and the digits are arranged in frames of 30 digits, then ten frames must be read per second; and, if digits are recorded ten to the inch longitudinally of the tape, then the tape speed past the reading station must be 2.5 feet per second. The main driving capstan 35 is accordingly rotated by motor 314 at a speed such that the tape lineal velocity at the reading station is 2.5 feet per second. The supply driver 134, continuously driven by motor 312, is rotated at a velocity such that in the absence of slippage the tape would be propelled at a speed of 4.8 feet per second, the effective velocity being sufficient to cope with a tape-moving speed of 3.9 feet per second at the input tape loop driving capstan 22, powered by the motor 313. The first auxiliary brake 33 intermittently establishes slippage between the tape and the input tape loop driving capstan 22, so that the tape does not stack up in the input tape loop box 21, even though the emerging velocity of 2.5 feet per second is less than the incoming velocity of 3.9 feet per second. The rim driving capstan 50 is continuously rotated by the motor 315 to provide an effective tape take-up speed at the core or spool 48 of approximately 3.15 feet per second, slippage being effected between the felt disc 162 and the driving flange 49 (Fig. 6), which slippage is automatically increased as the tape builds up on the spool 48. However, the higher velocity assigned to rim driving capstan 50 insures that the tape will be taken up at least as rapidly as it is read at the reading station. The various velocities mentioned herein are not critical but are given because such an arrangement has provided an effective tape-feeding apparatus.

It should now be apparent that the first and second auxiliary brakes 33 and 60 are not required to stop the tape within minor fractions of an inch of tape movement because of the tape loop boxes and the leeway afforded by the velocity considerations. However, the speed of operation of the high-speed brake 37 is more important because, when a stop signal is sensed at the reading station, the tape must be arrested immediately or else the reading information will be impaired; i. e., some of the information will be carried past the reading station while the stop signal is effective. With the tape moving at 2.5 feet per second and adjacent digits or apertures in any channel being spaced apart $\frac{1}{10}$ of an inch, the calculated time required for the tape to move consecutive or adjacent apertures past a given point, such as the reading station, is 3.33 milli-seconds. By actual measurement, it has been found that the main or high-speed brake 37 will stop the tape in less than 0.333 milli-seconds, or, in other words, the tape is arrested with the stop perforation which initiated the arresting operation remaining in the reading position.

A circuit for effecting the instantaneous control of the high-speed brake 37 under the supervision of the reading station is shown in Fig. 11. A photocell 321, of the aforementioned lead sulfide type, is contained in the reading unit 36 (Fig. 1) to sense the stop channel for the stop signal perforations 91, illustrated in the tape of Fig. 3*a*. The photocell leads 322 and 323 are encased in a shielded cable 324 (also visible in Fig. 1), with the lead 322 being tapped into a referencing resistor 325, of 50,000 ohms, connected between ground and a D. C. terminal 318, which is +200 volts with respect to ground. A further referencing resistor 327, also of 50,000 ohms, is connected between ground and a D. C. terminal 328, which is −150 volts with respect to ground. The other photocell lead 323 is connected to a matched load resistor 329 of, for example, 396,000 ohms, at junction point 330, the other side of the load resistor being tapped into the referencing resistor 327. The referencing resistors 325 and 327 permit adjustment of the potential effective at junction point 330, so that uniformity of operation may be achieved with different photocell replacements. The matched load resistor 329 has a value such that the "white" potential at junction point 330 is zero volts—i. e., when photocell 321 is excited by light—and the "gray" potential, corresponding to a slight amount of light passing through the unapertured portions of the semi-translucent tape, is —8 volts at junction point 330.

A filter circuit including a 10,000-ohm resistor 341, connected to junction point 330 and by-passed to ground by a 0.001-microfarad condenser 342, is provided to eliminate "paper noise," because the translucency of the paper tape is not always constant. The filter circuit extends by way of a parasitic suppressor resistor 345, of 470 ohms, to the control electrode 343 of a pentode 344, of the 6AS6 type, connected as a voltage amplifier and arranged to saturate early in the grid excursion to avoid time delays to signal passage. The cathode 346 of tube 344 is grounded, and the suppressor grid 347 is connected to the cathode. The screen grid 348 is connected into a voltage-dividing arrangement including a resistor 349, of approximately 33,000 ohms, grounded at one end and connected to a resistor 350, of 22,000 ohms, to which is applied a potential of +200 volts at terminal 351.

The plate 352 of tube 344 is connected to a +300-volt terminal 353 by way of a load resistor 354, of 68,000 ohms. A voltage divider, including the series-connected resistors 355 and 356, of respectively 470,000 and 330,000 ohms, extends between the plate 352 and the −150-volt terminal 357, providing direct coupling to a wave-shaping and -amplifying circuit including the pentode 358, also of the 6AS6 type.

The wave-shaping circuit is designed to sharpen or steepen the wave fronts of the pulses amplified by tube 344, and, like the tube 344, tube 358 is connected to saturate early in the grid excursion. Since the stop signal apertures 91 (Fig. 3*a*) are usually circular, the amount of light striking the photocell 321 via each stop aperture varies in accordance with an increasing segmental area thereof, thus resulting in a signal exhibiting a generally exponential shape or at least a shape having a slope less than infinity being applied to the control grid 343 of the amplifier tube 344. This signal, amplified, appears across resistor 356 at a suitable referenced level for application to the wave-shaping stage. The signal is introduced to the control grid 359 of tube 358 via a parasitic suppressor resistor 361, the cathode 360 being grounded. The wave-shaping circuit produces a signal in accordance with the applied stop signal but requiring less time for its excursion, so as to enable operation of the high-speed brake 37 (Figs. 1 and 2) at a time corresponding to light energization of photocell 321 of less than maximum.

The wave-shaping circuit utilizes a voltage divider network comprising series-connected resistors 362, 363, and 364, of, respectively, 47,000, 470,000, and 330,000 ohms, connected between +300-volt terminal 365 and —150-volt terminal 366, to establish static operating conditions for the suppressor grid 367, which is connected via a 470-ohm parasitic suppressor resistor 368 to the end of resistor 363 at junction point 369. The screen grid 370 is directly connected to the other end of the divider network resistor 363 at junction point 381. Hence the suppressor potential follows the screen potential but at a voltage level diminished by the drop across resistor 363 except for transient conditions which are equally effective at junction points 381 and 369 due to the peaking capacitor 382, of 100 micro-microfarads, which is connected across the resistor 363. A load resistor 383, of 100,000 ohms, is connected between the anode 384 of tube 358 and +300-volt terminal 365, and a feedback path including condenser 385, of 100 micro-microfarads, extends from the anode 384 to the control grid 359 by way of the parasitic suppressor resistor 361. A stabilizing resistor 386, of 1.5 megohms, is shown in shunt with the condenser 385, its use being optional.

The operation of the wave-shaping circuit including tube 358 will be described with respect to the conducting (normal) and non-conducting states and the transitions therebetween. The 6AS6 type tube employed as the pentode 358 is characterized in construction in such a way that the suppressor grid 367 is capable of approximately the same degree of control of the plate current as the control grid 359 but exercises no control over electron flow to the screen grid 370. The tube 358 acts as a triode when the potential of the suppressor grid 367 is at least 10 volts negative with respect to the cathode 360 because the plate current is cut off and the screen current is under the control of the control grid 359. The circuit of the wave-shaper stage is such that plate current flows only during the transition intervals. By definition, the tube 358 is in its conducting state when screen current flows and in its non-conducting state when the screen current is zero.

The normal condition for tube 358 is conducting, since no stop aperture is being read by photocell 321, and hence amplifier tube 344 is off, establishing a positive or at least zero bias on grid 359 relative to the cathode 360 to permit screen current flow. The potential of junction point 381 between resistors 362 and 363 of the voltage divider is reduced to its lowest value due to the screen current flow, and junction point 369 follows to establish approximately a negative 60-volt potential level for the grid 387 of a first section of a 12AU7 type tube 388 by way of a connection including a parasitic suppressor resistor 402, of 470 ohms. Since the suppressor grid 367 is below —10 volts relative to the grounded cathode 360, the wave-shaper tube 358 is cut off with respect to plate current but by definition is in the conducting state due to screen current flow and is acting as a triode, with the screen 370 considered as the anode.

The transition from the conducting state to the cutoff state for tube 358 of the wave-shaping circuit is occasioned by the tape-carried stop signal being sensed by photocell 321 to cause the voltage applied to control grid 343 of the amplifier tube 344 to rise from approximately —8 volts to zero relative to the cathode 346, causing tube 344 to conduct. The resulting anode potential drop, which occurs when tube 344 conducts, is applied to the control grid 359 of tube 358 of the wave-shaping circuit. Although the voltage change might be considered quite abrupt, it is relatively slow when considered in terms of micro-seconds or fractions thereof, as as been pointed out hereinbefore. However, as soon as the anode potential of amplifier tube 344 begins to decrease, the control grid 359 of tube 358 starts moving from a zero potential level (relative to the cathode 360) toward a —35-volt potential level, as established by the the voltage divider including resistors 355 and 356, when the amplifier tube 344 is strongly conducting. As the potential of the control grid of tube 358 becomes more negative, the screen current is also reduced, causing a rise in potential of junction points 369 and 381, which starts the suppressor grid 367 rising from approximately —60 volts toward zero. As the control grid 359 is driven more negatively, the screen current increases until the suppressor voltage exceeds its cut-off value, or —10 volts, to permit plate current to begin to flow. This action occurs even though the control grid is being driven negatively, and the tube now begins to function as a pentode rather than as a triode.

As the plate current increases, the potential of anode 384 decreases, the effect being transmitted to the control grid 359 by way of condenser 385 to reinforce the grid drive to drive the grid potential negatively at a more rapid rate. Consequently, the screen current is further reduced, thereby increasing the potential on suppressor grid 367 to permit increasing plate current, which in turn further reinforces the grid drive. This action continues until the control grid 359 dominates the suppressor grid 367 in control of the plate current, the control grid being capable of reducing the plate current to zero at —8 volts and of assuming control to the exclusion of the suppressor grid prior to the cut-off potential. Since the control grid potential governs the magnitude of plate current, the latter reduces from a maximum, and the anode potential rises, which detracts from the grid drive instead of reinforcing it, until the grid potential reaches the cut-off value, thereby establishing the non-conducting state for the tube 358. However, only the steepened curve or pulse effected by reinforcing the negative excursion of the grid is utilized, and the undesired bend portion, produced by the anode potential rise, is rendered ineffective by suitable biasing or reinforcing at the tube 388.

When the tube 358 of the wave-shaper circuit becomes non-conducting (due to the stop-signal-developed voltage pulse applied to control grid 359), the junction point 369 rises in potential from approximately —60 volts to zero, permitting the tube 388 to operate because its grid 387 becomes sufficiently positive relative to its cathode 389. The tube 388 is connected as a cathode follower, its cathode being connected through load resistor 390, of 10,000 ohms, to —150-volt terminal 391, and its plate or anode 392 being connected to +200-volt terminal 393.

A lead 394 extends from the junction point 395 between the cathode 389 and the load resistor 390 to the control grid 396 of a gaseous discharge tube 397, of the 2D21 type, by way of a grid-current-limiting resistor 398, of 47,000 ohms. The anode 399 of gas tube 397 is extended to +200-volt terminal 401 by way of a normally-conducting anode switching tube 411, which may be the other section of tube 388. The cathode 412 of gas tube 397 is grounded through a 10,000-ohm load resistor 413, and the auxiliary grid 414 is tied to the cathode. A voltage-dividing network, including resistors 415 and 416, having values of 230,000 and 470,000 ohms, respectively, is connected between the cathode 412 and the —150-volt terminal 417, which, in the absence of conduction of gas tube 397, establishes the potential level of the cathode 412 at approximately —2 volts and the junction point 418 between the resistors 415 and 416 at approximately —50 volts with respect to ground.

A lead 419 extends from junction point 418 to the grid 420 of a brake-operating tube 421 of the 6CL6 type by way of a parasitic suppressor resistor 422, establishing the grid potential at approximately —50 volts with respect to the grounded cathode 423 when the photocell 321 is dark and the gaseous discharge tube 397 is non-conducting. The brake coil 96 (Figs. 2 and 11) for the high-speed brake 37 is adapted to be energized (when the brake-operating tube 421 is operating) by way of a 5,000-ohm resistor 424, connected between a +300-volt terminal 425 and one end of the coil and a parasitic suppressor resistor 426, connected between the other side of the brake coil 96 and the anode 427 of the tube 421. The opposite ends of the coil 96 are connected to ground by way of the condensers 428 and 429, respectively, condenser 428 being a storage condenser having a magnitude of 0.05 microfarad and the condenser 429 being a de-coupling condenser of 0.001 microfarad. The screen grid 430 of tube 421 is connected to positive terminal 425 by way of a dropping resistor 451, of 10,000 ohms, the screen grid being by-passed to ground by a condenser 452, of 0.1 microfarad, and the suppressor grid 453 being directly grounded.

Normally the gas tube 397 is non-conducting, so that the potential of control grid 420 of the brake-operating tube 421 (connected as a power amplifier) is approximately −50 volts as determined by the resistors 415 and 416 of the voltage divider forming a part of the cathode circuit of the gaseous discharge tube 397. Under these circumstances, tube 421 is normally non-conducting. Accordingly, the condensers 428 and 429 are normally charged to the value of the D. C. voltage applied at the terminal 425, the former by way of the resistor 424 and the latter by way of the same resistor and the brake coil 96.

However, when a stop signal is sensed, the potential at junction point 369 in the output of the wave-shaping circuit is rapidly changed from approximately −60 volts to zero by the action described above to cause the potential of cathode junction point 395 of cathode follower tube 388 and hence the grid 396 of gaseous discharge tube 397 to follow a similar change, thereby firing the tube 397. A peaking condenser 454, of 100 microfarads, transfers the sudden potential change effective at the cathode 412 of the gas tube 397 to junction 418 between resistors 415 and 416, so that the grid potential on control grid 420 of the brake-operating tube 421 is as rapidly changed from approximately −50 volts toward a peak of about +20 volts, which then returns to the steady state level of about zero volts.

In order that the brake coil 96 may be fully energized rapidly, the effect of its inductance must be overcome. The condenser 428, being charged to the potential level of the source applied at positive terminal 425, initially supplies plate current for the tube 421 by way of the coil when the grid 420 is shifted positively, because the tube completes a discharge path which has very low resistance initially because of the positive drive on the grid. The condenser voltage is high enough to "brute force" current through the coil, causing it to apply the high-speed brake 37 almost instantaneously. As the condenser 428 discharges, the resulting increasing current flow through resistor 424 drops the voltage at the upper end of the coil to a value which maintains the coil active with a minimum of sustaining energy stored in its field. Hence the brake-operating tube 421 may be subsequently cut off safely and in less time. The coil 96 in the anode circuit of brake-operating tube 421 is de-energized as a result of gaseous discharge tube 397 being extinguished, so that the potential of junction point 418 again approaches −50 volts to enable cut-off of brake-operating tube 421. When the potential of control grid 420 is rapidly returned to the negative or non-operative level, a high frequency damped oscillation is established in the circuit including the coil 96 and the condensers 428 and 429. The energy of coil 96 is dissipated in the internal resistance of the coil, and the brake is relieved fairly rapidly, as the damping is high.

As is well known, once a gas tube is fired, it is usually extinguished by interruption of its anode-cathode potential supply or by causing its anode potential to approach zero, or that of its cathode. The switching tube 411 is provided for this purpose, the tube being connected as a cathode follower having its cathode 455 connected to the anode 399 of the gaseous discharge tube 397 by way of a lead 456, so that the gaseous tube is supplied with anode potential from terminal point 401 through the anode-to-cathode path 457—455 of switching tube 411 when the latter tube is conducting. Normally, switching tube 411 is operating or conducting, so that anode potential is available for the gas tube. The gas tube operates only during a portion of the time interval when the tape stop aperture admits light to photocell 321.

The circuit of Fig. 11 is adapted to arrest the tape movement for a predetermined time interval upon the sensing of a stop signal and then automatically resume tape feed. Once the photocell 321 is energized, the potential at junction point 395, connected to the gas tube control grid 396 by lead 394, rises to approximately zero volts to fire the gas tube 397, since the switching tube 411 is operating. A diode 460, preferably one half-section of a 6AL5 type tube, connected between lead 394 and ground, acts as a clamp to prevent a material potential rise of lead 394 above zero volts. The predetermined time interval begins with the firing of the gas tube and is under the control of a plurality of condensers 461 through 464, having values increasing by a factor of 10, from 100 micro-microfarads to 0.1 of a microfarad. The condensers are adapted to be selectively connected in a D. C. charging path by a manually-operable switch 465. The source of charging potential is applied at +300-volt terminal 466 and includes a 100,000-ohm resistor 467 connected in the anode circuit of a tube 468 used as an amplifier and wave-shaping device similar to the tube 358 and its associated circuitry, a feed-back resistor 469, of 22 megohms, a grid resistor 470, of 220,000 ohms, and a diode 491, which may constitute the other half-section of the tube 460.

Normally the potential of the cathode 492 of diode 491 is approximately −60 volts, corresponding to the dark condition for photocell 321, so that the condenser selected by switch 465 (shown as condenser 464 in Fig. 11) is charged negatively due to the potential applied from the −150-volt terminal 391, thereby insuring that the time delay tube 468 is non-conducting with respect to both screen and plate current. However, when a stop aperture is sensed by photocell 321, the potential of the cathode 492 of the diode 491 is suddenly raised to approximately zero volts, prohibiting conduction through the diode and causing the condenser 464 to discharge by way of a variable resistor 493, of 10 megohms, the value of which, when taken in combination with the value of the condenser selected by switch 465, determines the time delay beginning with the sensing of a stop aperture and continuing until tube 468 is caused to operate by the reduction of the negative potential on its control grid 494 due to the discharge of the condenser 464.

The tube 468, along with the associated wave-shaping circuitry, steepens the exponential wave form developed by the discharging condenser 464, so that a pulse is applied to the control grid 495 of a first phase inverter amplifier tube 496 by way of a 100-micro-microfarad peaking condenser 497 and a 470-ohm parasitic suppressor resistor 498. The pulse applied to phase inverter tube 496 is negative due to the screen current flow of tube 468 and therefore serves to cut off the tube 496, so that the potential established between the anode 499 and the 47,000-ohm load resistor 500, which resistor is also connected to the +300-volt terminal 508, increases to apply a positive pulse to control grid 505 of a second phase inverter amplifier tube 506, constituting the other section of the 12AU7 tube. When tube 496 is conducting normally, tube 506 is off because of the potential distribution across a voltage divider including resistors 501 and 502, of 220,000 and 270,000 ohms, respectively, connected between −150-volt terminal 503 and junction point 504. The application of a negative pulse to tube 496 causes it to go off and thereby raise the potential of control grid 505 of tube 506 sufficiently to permit operation. The anode 507 of phase inverter tube 506 is connected to the +300-volt terminal 508 by way of a 47,000-ohm plate resistor 509. A lead 510 extends from a junction point 511 between anode resistor 509 and the anode 507 of tube 506 and over a normally-closed switch 551 to a 500,000-ohm potentiometer 512, the other end of which is connected to −150-volt terminal 513.

The control grid 514 of the switching tube 411 extends via 470-ohm parasitic suppressor resistor 515 to the potentiometer 512, being adjustably connected thereto by way of tap 516. A peaking condenser 517, of 100 micromicrofarads, by-passes the portion of the potentiometer 512 between the tap 516 and the junction point 511 to enable changes in potential to be applied rapidly to the grid 514 such that, when the phase inverter tube 506 is operated, the decrease in potential of junction point 511 is transferred to the control grid 514 of switching tube 411, which correspondingly decreases the potential of cathode 455 to extinguish gaseous discharge tube 397. When gas tube 397 is extinguished, the potential of junction point 418 is rapidly dropped to approximately −50 volts to cut off the brake-operating tube 421 by way of its control grid 420 and de-energize the brake coil 96, the condenser 429 serving to absorb the inductive voltage developed by the coil 96, so that the brake-operating tube 421 is rapidly cut off and the brake released.

It may therefore be appreciated that tape motion is automatically resumed after a predetermined interval of arrested motion, as determined by the time constant of the selected condenser from the group consecutively numbered between 461 and 464 and the resistor 493. The circuit of Fig. 11 is therefore particularly desirable when a utilizing device having a rhythmic cycle is employed, the tape-feeding and -reading mechanism supplying information to the utilizing device and then providing no output for a predetermined time interval during which the utilizing device is sorting, storing, or otherwise utilizing the tape-carried information. The condensers 461 through 464 and the adjustable resistor 493, of course, provide a means for determining the interval of arrested tape motion.

The operation of the control circuit will now be briefly reiterated without reference to detailed structure and in the light of exemplary speeds effected by the electronic supervision of the magnetically-operable brake. Considering a tape speed of 2.5 feet per second at the reading station and a diameter of approximately 0.04 inch for the stop apertures 91 (Fig. 3*a*), the time required for a single aperture to pass the sensing region is 1.33 milliseconds. The brake 37 has been found capable of stopping the tape 15 in 0.333 millisecond, measured from the time light strikes the photocell 321, such time permitting tape movement of the order of approximately 0.01 inch. Since the movement is less than the aperture diameter, the tape comes to rest in a position in which light continues the energization of the photocell. Accordingly, the potential of junction point 395 or cathode 389 of the tube 388 remains approximately zero during arrested tape motion, the photocell 321 being energized and tube 388 being in its operating condition. This condition persists until the stop aperture is removed from the sensing region because, even though the switching tube 411 is caused to interrupt the conduction of gas tube 397 after the selected predetermined time interval has elapsed, the potential of junction point 395 remains at zero volts until the photocell 321 is again dark.

When the tape has moved the stop aperture out of the sensing area due to the automatic release of the brake, the tape then interrupts the light to the photocell 321, the amplifier tube 344 is rendered inoperative, the wave-shaper tube 358 becomes operative to reduce the potential of control grid 387 of the cathode-follower-connected tube 388, and junction point 395 is dropped to approximately a −60-volt level. Since the control grid 396 of gas tube 397 is again negative with respect to the cathode 412, the anode potential derived from positive terminal 401 may be re-established without causing the tube to fire. This is effected simultaneously with the foregoing because, when the potential at junction point 395 is dropped from approximately zero to −60 volts, the diode 491 immediately becomes conductive to reduce the potential of control grid 494 of tube 468 accordingly, so that screen grid current flow in tube 468 is cut off. The condenser 497 applies a positive going pulse to control grid 495 of the first inverter tube 496, causing this tube to operate and the second inverter tube 506 to become inoperative, thereby raising the potential effective at the control grid 514 of switching tube 411 to close the anode circuit for gas tube 397.

From the above, it is clear that the cathode of the tube 388 or the junction point 395 between the cathode 389 and the negative potential supply terminal 391 provides two electrical conditions, the first being a potential level of approximately −60 volts and the second a zero potential level. For normal operation of the tape-feeding and control apparatus, a normal sequence of events may be outlined with reference to the junction point 395 and the control circuit responsive to the electrical conditions established at this point.

The usual electrical condition at the cathode of tube 388 is a potential level of −60 volts because the tape 15 is normally interrupting the light to photocell 321, so that its dark condition maintains the −60-volt level until a stop aperture permits energization of photocell 321 and the operation hereinbefore outlined obtains to cause the potential at junction point 395 to be shifted suddenly to approximately the zero volt level. Tape motion is accordingly arrested because the gas tube 397 is fired as the potential of point 395 is raised, and the brake-operating tube 421 is operated to energize brake coil 96. The RC network comprising condenser 464 and resistor 493, in conjunction with delay tube 468, provides a time delay between the application of the brake and its release. At the expiration of the selected time delay, the switching tube 411 sufficiently diminishes the anode supply for gas tube 397 to extinguish the tube, thereby providing a negative potential at junction point 418, supplying control grid 420 of brake-operating tube 421 to release the brake by de-energizing brake coil 96. When the tape 15 is released, the continuously-operating driving capstan 35 and pressure roller 38 (Fig. 1) immediately impart drive to the tape to cause it to move the stop aperture away from the sensing region, so that photocell 321 again becomes dark and causes the potential level of junction point 395 to revert to −60 volts, which is the potential level of the control grid 396 of gas tube 397. This potential change also causes the control grid 494 of delay tube 468 to be suddenly decreased by way of diode 491, thus reducing the screen current of tube 468 to zero, causing the first phase inverter tube 496 to operate and the second phase inverter tube 506 to be rendered inoperative, so that the switching tube 411 becomes operative to re-establish anode potential for gas tube 397. The brake control circuit is thus restored to a condition for effecting braking as soon as photocell 321 senses the next stop aperture in the manner hereinbefore explained.

Although the foregoing action is that generally encountered in actual practice, the circuit of Fig. 11 incorporates an interlocking feature which becomes effective to prevent resumption of tape feed if the tape for any reason should fail to stop with the control aperture in reading position. For example, the normal electrical transition at junction point 395 may be regarded as a potential change from approximately −60 volts to zero, with the gas tube 397 being fired and the potential of junction point 395 remaining at zero as long as the tape is stopped. However, an abnormal condition is presented if the potential level of junction point 395 is rapidly varied from approximately −60 volts to zero and back toward −60 volts. The rise in potential to zero volts will fire tube 397 to cause the brake to be applied in the usual manner, but the rapid return of the voltage toward −60 volts, as the control aperture is moved past the reading station by the over-drive of the tape, occurs before the condenser 464 in the time delay circuit can discharge through the resistor to allow tube 468 to conduct and cause the operation of tube 411 to extinguish the gas tube 397 and release the brake.

When the point 395 returns toward −60 volts, this voltage is applied over diode 491, in the usual manner, to the condenser 464 and the tube 468 to restore the time delay circuit to starting condition and to maintain tube 468 biased to non-conduction. This abnormal transitional condition effects the interlocking action in that the gas tube cannot be extinguished, and therefore the brake coil 96 remains energized and the brake applied, with the tape arrested. The failure of the feeding mechanism to re-establish tape motion is sufficient to summon an attendant, who may clear the machine by opening switch 551 in lead 510, which renders tube 411 inoperative, thereby extinguishing the gas tube 397. Closing of the switch then returns the circuit and the feeding apparatus to normal, and the section of tape wherein the reading was impaired may be run through again.

In the event that the utilizing device is not rhythmic but is of a type which signals at random for more tape to be read, the tape-feeding mechanism is controlled by the circuit of Fig. 12, which is adapted to replace the boxed-in portion of the circuit of Fig. 11. The circuit which is responsive to the signals from the utilizing device, although enabling random release of the brake after applications effected by the tape-carried stop signals, imposes a time delay to a recycling of the circuit sufficient to permit the tape to carry the stop signal beyond the sensing region. The components of the circuit of Fig. 12 corresponding to elements of the circuit of Fig. 11, previously described, have been assigned corresponding numbers bearing primes. For example, the tube 388′ of Fig. 12 corresponding to the tube 388 of Fig. 11 is adapted to establish similar electrical conditions at junction point 395′ between its cathode 389′ and load resistor 390′, the potential of the junction point changing from approximately −60 volts to zero when a stop aperture enters the sensing region and permits energization of photocell 321 (Fig. 11). The upper potential level of junction point 395′, which is connected to the control grid 396′ of gaseous discharge tube 397′ by way of lead 394′, is determined by the diode clamp 460′ in the manner explained heretofore. Also, when the junction point 395′ is boosted in potential from −60 volts to approximately the zero potential level, the gas tube 397′ conducts to increase the potential level of junction point 418′ between resistors 415′ and 416′ sufficiently to permit control electrode 420′ to cause operation of tube 421′ to energize brake coil 96′, thereby applying the brake in response to the stop aperture which admitted light to photocell 321.

The interval of arrested tape motion is under the control of the utilizing device, which is adapted to apply a signal for more tape (or read order) to the control circuit at terminals 521 when the device is ready to accept more information. Tube 496′, corresponding to the first phase inverter tube 496 (Fig. 11) in the circuit for releasing the brake, operates as hereinbefore explained, but it is controlled in a slightly different manner. Its control electrode 524 is connected to the control electrode 523 of the right-hand tube section 525 of a conventional trigger pair. In the trigger pair, the left-hand tube section 526 is normally off, and the right-hand section 525 is normally on. The grid potential of the tube section 525 is sufficiently high for conduction, and accordingly the tube 496′ is normally conducting, but the introduction of a negative signal at terminals 521 causes conduction in diode 528 and a resulting drop of the potential level of grids 523 and 524, so that the tube section 526 assumes the conducting state, and section 525 and tube 496′ are rendered inoperative.

A second phase inverter tube 506′ (corresponding to tube 506 of Fig. 11) has its control electrode 505′ connected to a voltage divider formed by resistors 501′ and 502′, which are connected between −150-volt terminal 503′ and junction point 504′, located between the anode 499′ and load-resistor 500′ of first phase inverter tube 496′. The phase inverter tube 506′ is normally inoperative due to the potential applied to its control grid from negative terminal 503′ but becomes operative when the read order renders the tube 496′ inoperative due to the resulting potential increase effective at its control grid 505′. The switching tube 411′ interrupts the anode supply from terminal 401′ to the anode 399′ of gas tube 397′ when tube 506′ becomes conducting because the potential effective at control grid 514′ by way of potentiometer 512′ is suddenly decreased.

Interruption of the anode potential supply for gaseous discharge tube 397′ rapidly decreases the potential at junction point 418′ and consequently on control grid 420′ of brake-operating tube 421′ to de-energize the brake coil 96′ and release the brake to permit tape feed to be resumed.

The purposes of the trigger pair 525 and 526 are to provide a memory control over the operation of tube 496′ and to insure a time delay sufficient as required for the stop aperture to be moved out of the sensing region before the anode supply circuit for gas tube 397′ is restored. Once the photocell 321 again becomes dark (due to tape movement), the potential of junction point 395′, in the cathode circuit of the cathode follower connected tube 388′, reverts to −60 volts. The control electrode 396′, connected to junction point 395′ by lead 394′ then is in condition to control the firing of gas tube 397′. Simultaneously a negative potential is applied to control grid 505′ of the second phase inverter tube 506′ by way of diode clamp 491′ to cut off this tube, thereby re-establishing the anode potential supply for gas tube 397′ by way of switching tube 411′. Hence the switching tube 411′ is positively maintained inoperative until the stop aperture has moved out of the sensing region, enabling the control electrode 396′ of gas tube 397′ to assume a potential for control purposes upon the sensing of a further stop signal.

The interlocking feature discussed in connection with the circuit of Fig. 11 is also provided for in the circuit of Fig. 12, through the diode clamping tube 491′. For example, assume that the potential at junction point 395′ of the tube 388′ varies rapidly from a −60-volt level to the zero volt level and back toward the −60-volt level due to an overshoot of the control aperture past the reading station, the gas tube 397′ being fired as the potential on its control grid 396′ changes from approximately −60 volts to zero volts. The tube remains on, even though the potential on its control grid suddenly drops to −60 volts, since the control grid no longer retains control of the gaseous type tube. The brake coil 96′ is energized when the gas tube 397′ conducts, because the brake-operating tube 421′ is rendered operative and remains so as long as the gas tube remains in a conducting condition. The latter is under the control of the switching tube 411′, which tube is in the conducting or operative condition regardless of the potential at junction point 395′, because, if the potential is −60 volts, the diode clamping tube 491′ drops the potential of control electrode 505′ of the second phase inverter tube 506′, rendering it inoperative and maintaining switching tube 411′ operative to complete the anode potential supply circuit for gaseous discharge tube 397′. On the other hand, if the potential at junction point 395′ is zero volts, normal operating conditions obtain in the circuit of Fig. 12, with the first phase inverter tube 496′ being conductive, the second phase inverter tube 506′ being cut off, and the switching tube 411′ completing the anode supply circuit for the gas tube 397′. Further, if the tape has not been stopped properly and the control aperture has overshot the sensing region, so that the photocell 321 is dark, occasioning the rapid potential changes at junction point 395′ from −60 volts to zero to −60 volts, then any read order applied to the first phase inverter tube 496′ is ineffective to render switching tube 411′ non-conducting, because the potential of junction point 395′ is locked at the −60-volt level and tube 506′ cannot be turned on because diode 491′ maintains its grid 505′ negative. As in the case with the circuit of Fig. 11, the feeding mechanism remains ineffective to move the tape under these conditions, since the brake 37 remains applied until an attendant clears the machine, clearing being most easily obtained by interrupting the anode circuit of the second phase inverter tube 506′ (or opening the switch 551′) temporarily, which action renders the switching tube 411′ momentarily non-conducting and extinguishes the gas tube 397′ to release the brake.

In addition to the brake control circuits of Figs. 11 and 12, reading circuits are provided for each of the five channels in which the apertures 92 may selectively be punched in tape 15 to represent data, as shown in Fig. 3*a*, a typical reading circuit being that represented in Fig. 13. Each of the reading circuits includes a photocell, such as that indicated at 541 in Fig. 13, which may be of the same type as photocell 321, heretofore described, positioned in the housing 36 (Fig. 2), so as to receive light through its related one of the holes 92′ in the aperture plate 77. The reading circuit of Fig. 13 may be identical to the corresponding portion of the circuit of Fig. 11, corresponding components functioning alike, and accordingly the circuit will be only briefly described. Energization of the photocell 541 by light passing through the appropriate hole 92′ when a data or digit representing aperture 92 in the tape 15 alines with the hole, raises the potential of the control grid 542 of a power amplifier tube 543 to cause it to operate. The tube 543 corresponds to the amplifier tube 344 of the circuit of Fig. 11. The resulting potential applied to control grid 544 of the tube 545, connected as a wave shaper (in accordance with tube 358 of Fig. 11), is reduced to cut off the screen current flow in the tube and thereby increase the potential of junction point 546. The control grid 547 of the tube 548, arranged for cathode follower operation in the manner of the tube 388 of Fig. 11, is connected to the junction point 546, so that the tube will conduct normally when a digit aperture is being sensed. Since the potential of cathode 549 of the tube 548 follows the potential of the grid 547, output pulses corresponding to the data or digits read from the tape 15 appear across the load resistor 550, with the output conductor 552 being provided for connection to the utilizing device to supply input data in the form of electrical pulses.

Although the invention has been described for feeding perforated tape, it is equally adapted to the handling of pliable tape in general. When magnetic tapes are used, magnetic-responsive elements or reading heads are used in place of the light-responsive reading unit 36. Also, since the information and stop signals carried by the tape are recorded by magnetizing the tape, the brakes are modified, so that flux produced to operate the brakes is not circulated through the tape. Such a modified brake is illustrated in Figs. 7 and 8 for gripping a magnetic tape 15*a*. The tape is supported on a lower shoe 561, of brass or other non-magnetic material, which extends through a slot 562 in a metal shielding plate 563 forming the visible surface of the frame 18 of Fig. 1. An L-shaped bracket 564 supports the coil 565 on the rear, or left-hand, side of the shielding plate and constitutes a portion of the return flux path, the armature 566 completing the path. The armature is the sole support for the shoe 561, being connected thereto by the screws 567. A lug 568, fixed to the L-shaped bracket, provides a pivot axis for the armature in the form of a pin 569. The right-hand end of the shoe 561 is normally positioned so that the shoe applies a slight loading to the tape even when the coil is de-energized. Energization of the coil 565, effected in the manner explained above, causes the armature to be drawn against the pole piece, moving the shoe 561 only an infinitesimal distance to press the tape against an upper shoe 572 (also preferably of brass or other non-magnetic material) fixed in position by an arm 573 extending outwardly of the plate 563. The gripping action arrests the tape in the manner of the brake 36 of Fig. 2. If the tape is of the oxide-coated variety or is in the nature of a permanent record to be read many times, the upper shoe 572 may be slightly concave, so that the gripping is effective at the outer edges of the tape rather than in the recorded area, suitable guides then being utilized to insure that the shoe is in contact with the outer portions of the tape. Otherwise, when a stop order is sensed, the brake functions to increase the pressure normally effective against the tape, the speed of response being comparable to that previously given, and the movement of the shoe being of an infinitesimal order. If auxiliary brakes are used, they are also of the character disclosed in Figs. 7 and 8.

In Fig. 9 is depicted a further modification of the brake of Fig. 2, for use with tapes of the non-magnetic variety. A pair of uprisers 591 is secured near the rear edge of the main laminations 592 by the screws 601 to provide a support for a bolt 593, which forms a pivot axis for the armature 594. The armature is capped, or partially enclosed, by a saddle-shaped plastic shoe 595, which has arcuate lateral (leading and trailing) edges. A similar plastic shoe 596 is fitted over the main laminations, the pivot axis being so located as to facilitate tape threading through the gap between the outer ends of the shoes but cause a slight pressure to be applied to the tape 15 when in its illustrated feeding position. When the coil 597 is energized, the pressure established by the armature shoe 595 is increased to arrest the tape movement. Chattering is eliminated by an adjustable screw 598 carried in the end of a cantilever arm fixed to the uprisers 591 by the screws 600.

A further feature offered by the brake of Fig. 9 is the inclusion of the opposed arcuate faces of the respective shoes, which collectively provide ingress and egress troughs for the tape. If the brake were used to replace the high-speed brake 37 of Fig. 1, for example, the idler 66 could be eliminated. If substituted for the second auxiliary brake 60, both of the idlers 63 and 64 would be unnecessary. The construction is particularly advantageous where the brake is located on a level different from that of adjacent components.

While the apparatus and circuitry herein illustrated and described are particularly adapted to fulfill the objects aforesaid, it is to be understood that other and further modifications may be made without departing from the spirit of the invention.

What is claimed is:

1. Tape-feeding apparatus for determining movement of a record tape relative to a reading station comprising, in combination, means for supplying the record tape, frictional driving means for normally engaging and drawing tape from the supplying means and moving it relative to the reading station, a brake normally slidably engaging the tape and adapted to grip the tape and overcome the frictional driving engagement, and an actuating means under the control of the reading station to cause the brake to grip the tape and arrest the motion thereof in response to information read from the tape.

2. In a tape-feeding apparatus for moving a record tape relative to a reading station, the combination comprising a tape-supplying means, a continuously-operating driving means yieldably to engage and move the tape, said supplying means and said driving means being disposed oppositely from the reading station with respect to tape movement, an electrically-operated brake disposed between the driving means and the tape-supplying means, said brake having a floating armature normally engaging the tape to apply slight pressure thereto and operable to apply greater pressure to the tape to arrest movement thereof, and means for causing the brake to operate, thereby arresting movement of the tape.

3. Tape-feeding apparatus for record tape having information and stop signals thereon, comprising, in combination, tape-supplying means, continuously-rotating tape-driving means adapted to engage the tape yieldably and move it from the tape-supplying means, a reading station between the tape-supplying means and the tape-driving means for interpreting the information carried by the tape, magnetically-operable brake means normally exerting pressure against the tape insufficient to cause the driving means to yield and adapted to grip the tape and arrest the motion thereof in response to the stop signals as interpreted at the reading station, and electrical control means responsive to said stop signals to cause the brake means to increase the pressure against the tape, thereby arresting tape motion.

4. Tape-feeding apparatus for record tape, comprising, in combination, tape-dispensing means, a continuously-rotating drive capstan over which the tape passes, movable pressure means for pressing the tape against the capstan to cause tape movement but displaceable away from the capstan as the tape is gripped at a position between the dispensing means and the drive capstan, tape take-up means continuously urging the tape against the pressure means and effective to displace the pressure means away from the capstan when the tape is gripped, a reading station between the tape-dispensing means and the drive capstan for interpreting information carried by the tape, magnetically-operable brake means adapted to grip the tape and arrest the motion thereof in response to certain information interpreted at the reading station, and elecrical control means responsive to said certain information to cause the brake means to grip the tape, thereby arresting tape motion.

5. In a tape-feeding apparatus for feeding a record tape, the combination comprising brake means engaging the tape to apply a normal pre-load thereto and operable to grip the tape and arrest movement thereof; a continuously-rotating drive capstan over which the tape passes; yieldable pressure means normally pressing the tape against the capstan to cause the pre-loaded tape to be driven thereby but yieldable when the tape is gripped to allow the capstan to continue to rotate without driving the tape; stop control means on the tape; means controlled by the stop control means to operate the brake thereby arresting further tape movement; and means to release the brake to permit tape movement.

6. In a tape-feeding apparatus for moving a record tape relatively to a reading station, the combination comprising a tape-supplying means, a first tape-driving capstan for moving the tape from the suplying means, a first brake disposed between the supplying means and the first capstan for gripping the tape, a high-speed brake located between the reading station and the first driving capstan for gripping the tape and arresting it in response to tape-carried signals, a main tape-driving capstan located beyond the reading station in the direction of tape progression, said first driving capstan driving the tape with at least as high velocity as that given the tape by the main driving capstan, said tape forming a loop between the first driving capstan and the high-speed brake, means controlled by the size of the loop for controlling the first brake and thereby maintaining the loop in the tape to isolate the reading station from the supplying means, and take-up means for receiving tape from the reading station and storing the tape in the form of a coil.

7. The device of claim 6 wherein the take-up means for receiving tape from the reading station includes a tape-take-up capstan for effecting a higher lineal velocity for the tape than the main driving capstan; a second loop in the tape between the main driving capstan and the take-up means; a second brake disposed between the second loop and the take-up means, for gripping the tape; and supervisory means controlled by the size of the loop controlling the second brake and thereby maintaining the second loop in the tape to isolate the reading station from the take-up means.

8. In a tape-feeding apparatus for moving a record tape relatively to a reading station, the combination comprising a tape-supplying means, a main tape-driving capstan disposed beyond the reading station in the direction of tape progression to provide a predetermined lineal velocity for the tape, a high-speed brake located between the tape-supplying means and the reading station for gripping the tape and arresting it in response to tape-carried signals, a tape-take-up means for receiving tape from the reading station and storing it in the form of a coil, a take-up driving capstan included in said last-mentioned means yieldably driving the tape at a tape lineal velocity at least as great as that produced by the main driving capstan, a loop formed in the tape between the main driving capstan and the take-up means to isolate the reading station and the take-up means; an auxiliary brake disposed between the tape loop and the take-up means for gripping the tape and arresting it; and means controlled by the loop for controlling the auxiliary brake and thereby maintaining the loop in the tape to maintain the isolation of the reading station from the take-up means during operation of the tape-feeding apparatus.

9. In a tape-feeding apparatus for record tape, the combination comprising a magnetic brake having a floating armature normally engaging the tape to apply pressure thereto and operable to increase the pressure and arrest tape movement, a continuously-rotating drive capstan over which the tape passes, resilient means normally urging the tape against the capstan to cause the tape to be driven through frictional engagement with the capstan, rotatable tape-take-up means urging the tape against the resilient means normally through a force insufficient to displace the resilient means from the capstan, a stop signal on the tape, means to sense the tape for the stop signal, means controlled by the sensing means for causing the brake to operate and arrest the tape movement when the stop signal is sensed, thereby causing the energy of rotation of the take-up means to be dissipated in momentarily displacing the resilient means, and means to cause the brake to be released when further tape feed is required.

10. In a tape-feeding apparatus for feeding a record tape past a sensing station, the combination of a brake located in front of the sensing station in the direction of tape feed, said brake normally engaging the tape to apply a drag thereto but operable to apply additional pressure to the tape to arrest the motion thereof; a continuously-operating driving means located beyond the sensing station in the direction of tape feed and engaging the tape with sufficient driving force to overcome the normal drag applied to the tape by the brake and pull the tape past the sensing station, said brake and driving means cooperating to maintain the tape always under tension at the sensing station; means to cause the brake to operate to arrest the tape feed; and means to release the brake when further tape feed is desired.

11. In a tape-feeding apparatus for feeding a record tape past a sensing station, the combination of a brake located in front of the sensing station in the direction of tape feed, said brake normally engaging the tape to apply a drag thereto but operable to apply additional pressure to the tape; a continuously-operating driving means located beyond the sensing station in the direction of tape feed and engaging the tape with sufficient driving force to overcome the normal drag applied to the tape by the brake and pull the tape past the sensing station but with insufficient force to pull the tape past the sensing station when the additional pressure has been applied to the tape by the operation of the brake, said brake and driving means cooperating to maintain the tape always under tension at the sensing station; means responsive to tape-carried signals to cause the brake to operate to arrest the tape feed; and means to release the brake when further tape feed is desired.

12. A tape-feeding and -reading apparatus capable of reading data from a record tape in the same order in which it was recorded, comprising means to read data from the tape; means to feed the tape past the reading means; and means for supplying tape from the inside of a roll of record tape under control of the feeding means; said supplying means including a plurality of arcuate shoes disposed in spaced-apart relation to outline a core for accommodating the roll of tape, a plurality of driving capstans located at spaced-apart positions generally along the core outline for driving engagement with the innermost layer of tape in response to a force applied to the emerging tape by the feeding means, and means for imparting continuous rotation to the driving capstans.

13. Tape-handling apparatus comprising, in combination, a reading station, means for supplying tape from the inside of a roll of record tape in proper order for reading at the station, driving means beyond the station relative to the direction of tape motion for engaging and drawing tape from the supplying means through the reading station, a magnetic brake between the supplying means and the driving means normally applying drag to tape motion through break-to-tape contact, and an electrical operating circuit under the control of the reading station to cause the brake to grip the tape and effect slippage between the tape and the driving means, thereby arresting the tape motion in response to information read from the tape.

14. In a device of the character described, tape-supplying means for feeding tape from the inside of a roll of record tape in response to tension established in the innermost layer of tape forming the roll, comprising a plurality of spaced-apart arcuate shoes oriented to outline a core for accommodating the roll, a feed-off drive roller and at least a pair of auxiliary rollers distributed along the core outline with the emerging tape passing over the feed-off roller, means to move the tape into driving engagement with the feed-off drive roller to tension the innermost layer into driving engagement with the auxiliary rollers, and means for gripping the tape to arrest the motion thereof in response to tape-carried information, whereby the means to move the tape into driving engagement with the feed-off drive roller is rendered ineffective.

15. A magnetically-operable brake for arresting the motion of a movable tape, comprising a support over which the tape passes, a brake shoe normally engaging the tape to apply a predetermined loading thereto, and electromagnetic means for causing relative movement between the shoe and the support to increase the pressure applied to the tape, thereby arresting the tape.

16. The brake of claim 15 wherein the brake shoe and the support are each saddle-shaped in section to guide the tape for brake ingress and egress.

17. A magnetically-operable brake for arresting the motion of a movable tape, comprising a body of magnetizable material over which the tape is adapted to pass; a floating armature supported by the body and resting on the tape; magnetizing means for establishing flux in the body; and guide means for locating the armature within the influence of the magnetizing means to complete a flux path therethrough, whereby energization of the magnetizing means increases the pressure applied to the tape by the armature to arrest the tape.

18. A magnetically-operable brake for arresting the motion of a movable tape, comprising a body of magnetizable material over which the tape is adapted to pass; a floating armature pressing the tape against the body; guide means for guiding the armature to allow movement toward and away from the body but preventing movement in the direction of tape feed; and magnetizing means for drawing the armature in the direction of the body to cause the tape to be gripped between the armature and the body, thereby arresting its motion.

19. A magnetically-operable brake for arresting the motion of a movable tape, comprising a body of magnetizable material, a saddle-shaped shoe supported on the body for providing an arcuate path for the tape, an armature pivotally suspended at one end in cantilever fashion above the shoe, a further saddle-shaped shoe partially encasing the armature to apply a preloading to the tape by pressing it against the first-mentioned saddle-shaped shoe adjacent to the said one end of the armature and spaced from the first-mentioned shoe at the free end of the armature, and electromagnetic means for pivoting the armature in the direction of the body to increase the pressure applied to the tape, thereby arresting the tape, said first-mentioned shoe and second-mentioned shoe defining a tape-guiding trough for brake ingress and egress and permitting tape threading at the free end of the armature.

20. A control circuit for tape-feeding apparatus including an electrically-operable brake for arresting tape motion in response to tape-carried stop signals comprising sensing means for searching the tape for a stop signal, a brake-operating circuit including a memory device controlled by the sensing means upon sensing a stop signal to cause the brake to operate and arrest the tape in a predetermined position relative to said sensing means; and a brake release circuit including a time delay means for rendering the memory device inoperative after a predetermined delay to allow tape feed to be resumed.

21. A control circuit for tape-feeding apparatus including an electrically-operable brake for arresting tape motion is response to tape-carried stop signals comprising sensing means for searching the tape for a stop signal, means controlled by the sensing means upon sensing a stop signal to cause the brake to operate and arrest the tape with said stop signal remaining in a sensing position; and means for releasing the brake including a time delay means to prevent re-operation of the brake during the time required for the tape to remove said stop signal from the sensing position upon resumption of tape feed.

22. A control circuit for tape-feeding apparatus including an electrically-operable brake for arresting tape motion in response to tape-carried stop signals comprising sensing means for searching the tape for a stop signal, a brake control circuit including a gaseous discharge memory tube controlled by the sensing means upon sensing a stop signal to cause the brake to operate and arrest the tape in a predetermined position relative to said sensing means; and means for extinguishing the memory tube to release the brake and allow tape feed to be resumed.

23. A control circuit for tape-feeding apparatus including an electrically-operable brake for arresting tape motion in response to tape-carried stop signals comprising sensing means for searching the tape for a stop signal, means controlled by the sensing means upon sensing a stop signal to cause the brake to operate and arrest the tape in a predetermined position relative to said sensing means; means operative to release the brake; means to cause the releasing means to operate to allow tape feed to be resumed; and means responsive to said sensing means for rendering the releasing means ineffective if the brake is applied in response to a stop signal but the tape carries the stop signal beyond the sensing means.

24. A control circuit for tape-feeding apparatus including an electrically-operable brake for arresting tape motion in response to tape-carried stop signals, comprising sensing means having a first electrical condition while searching a tape for a stop signal and a second electrical condition while sensing a stop signal, brake-operating means including a memory device responsive to the sensing means changing from said first condition to said second condition to apply the brake and maintain it applied, thereby arresting the tape with the stop signal remaining in the position in which it is being sensed, time delay means also responsive to the sensing means and set into operation when the sensing means changes from said first condition to said second condition and effective after a predetermined time period to render the memory device ineffective to maintain the application of the brake, thereby to enable tape feed to be resumed to move the stop signal away from the sensing means after said predetermined time period, and means to condition the memory device for subsequent application of the brake when the sensing means returns to the first electrical condition.

25. A control circuit for tape-feeding apparatus including an electrically-operable brake for arresting tape motion in response to tape-carried stop apertures and including a light source adapted to direct a beam of light onto the tape, said control circuit comprising light-responsive sensing means oppositely disposed from the light source relative to the tape for searching the tape for a stop aperture; means controlled by the sensing means upon being illuminated through a stop aperture to cause the brake to operate and arrest the tape with said stop aperture remaining in a position to admit light to said sensing means; means for releasing the brake; means to cause the releasing means to operate after the incidence of arresting tape motion; and means responsive to said sensing means for rendering the releasing means ineffective if the brake is applied in response to a stop-signal-caused illumination of the sensing means but the tape carries the stop signal beyond the light beam, thereby removing the illumination of the sensing means.

26. A control circuit for tape-feeding apparatus including an electrically-operable brake for arresting tape motion in response to tape-carried stop signals and responsive to a signal for tape to resume tape feed, said circuit comprising sensing means having a first electrical condition while searching a tape for a stop signal and a second electrical condition while sensing a stop signal, brake-operating means including a memory device responsive to the sensing means' changing from said first condition to said second condition upon sensing a stop signal to apply the brake and maintain it applied, thereby arresting the tape with the stop signal in the position in which it is being sensed by the sensing means, time delay means responsive to a signal for tape to render the memory device ineffective to maintain the application of the brake for a predetermined time period at least as long as the time required for the tape to move the stop signal away from the sensing means, and means responsive to the sensing means when it returns to the first electrical condition to condition the memory device for subsequent application of the brake.

27. A control circuit for tape-feeding apparatus including an electrically-operable brake for arresting tape motion in response to tape-carried stop signals, comprising sensing means having a first electrical condition while searching a tape for a stop signal and a second electrical condition while sensing a stop signal, brake-operating means including a gas tube which is fired in response to the sensing means' changing from said first condition to said second condition upon sensing a stop signal and operable to cause the brake to be applied and maintained applied, thereby arresting the tape with the stop signal in the position in which it is being sensed by the sensing means, time delay means also responsive to the sensing means and set into operation when the sensing means changes from said first condition to said second condition and effective after a predetermined time period to extinguish the gas tube, which causes the brake to be released, thereby to enable tape feed to be resumed to move the stop signal away from the sensing means after said predetermined time period, means responsive to the time delay means to condition the tube for subsequent application of the brake when the sensing means returns to the first electrical condition, and overthrow indicating means controlled by the sensing means for rendering the time delay means ineffective to extinguish the gas tube if the tape is arrested without a stop signal in position to be sensed, thereby maintaining the brake applied.

28. A control circuit for tape-feeding apparatus which includes an electrically-operable brake for arresting tape motion in response to tape-carried stop signals, comprising sensing means for searching the tape for a stop signal, means controlled by the sensing means upon sensing a stop signal to cause the brake to be operated and arrest the tape in a predetermined position relative to the sensing means, and means controlled by the sensing means for releasing the brake after a predetermined time measured from the incidence of arresting tape motion.

29. A control circuit for tape-feeding apparatus which includes an electrically-operable brake for arresting tape motion in response to tape-carried stop signals, comprising sensing means for searching the tape for a stop signal, means controlled by the sensing means upon sensing a stop signal to cause the brake to be operated and arrest the tape in a predetermined position relative to the sensing means, means controlled by the sensing means for releasing the brake after a predetermined time measured from the incidence of arresting tape motion, and means responsive to said sensing means for rendering the releasing means ineffective to release the brake if the tape overthrows said predetermined position.

30. A control circuit for tape-feeding apparatus which includes an electrically-operable brake for arresting tape motion in response to tape-carried stop signals, comprising sensing means for searching the tape for a stop signal, means including a gaseous discharge device which is fired under the control of the sensing means upon sensing a stop signal to cause the brake to be operated and arrest the tape in a position with said stop signal being sensed, time delay means initiated into operation by the sensing means for extinguishing the gaseous discharge device to release the brake after a predetermined time measured from the incidence of arresting tape motion, and means responsive to said sensing means for preventing extinguishment of the gaseous discharge device if the gaseous discharge device is fired and the tape overthrows or carries said stop signal beyond the sensing position.

31. A control circuit for tape-feeding apparatus incorporating an electrically-operable brake for gripping the tape and arresting the motion thereof in response to tape-carried stop signals, comprising means to sense the tape for a stop signal, means responsive to the sensing means to provide a first electrical condition indicative of the absence of sensing of any stop signal and a second electrical condition indicative of the sensing of a stop signal, means responsive to the second condition to operate the brake, thereby arresting tape movement, brake-releasing means operable to render the brake non-operative, thereby permitting tape movement, time delay means responsive to said second condition to render the releasing means operable after a predetermined time delay measured from the occurrence of the second condition, and means responsive to a change of conditions from the first to the second to the first when the later shift occurs in less time than the predetermined time delay to render the time delay means ineffective to operate the releasing means whereby the brake continues to grip the tape.

32. A control circuit for tape-feeding apparatus incorporating an electrically-operable brake for gripping the tape and arresting the motion thereof in response to tape-carried stop signals, comprising means to sense the tape for a stop signal, means responsive to the sensing means to provide a first electrical condition indicative of the absence of sensing of any stop signal and a second electrical condition indicative of the sensing of a stop signal, means responsive to the second condition to operate the brake, thereby arresting tape movement, brake-releasing means operable to render the brake non-operative, thereby permitting tape movement, and time delay means responsive to said second condition to render the releasing means operable after a predetermined time delay measured from the occurrence of the second condition.

33. In a tape-feeding apparatus for moving a record tape relative to a reading station, the combination comprising a continuously-operating driving means yieldably engaging the tape to move it along a path through the reading station, an electrically-operable brake disposed along the path adjacent to the reading station normally slidably engaging the tape to exert a pressure against the tape to apply a predetermined drag on the tape which is insufficient to cause the driving means to yield, and means for causing the brake to increase the drag on the tape in amount sufficient to cause said driving means to yield to arrest the tape movement.

References Cited in the file of this patent

UNITED STATES PATENTS

| | | |
|---|---|---|
| 1,121,231 | Davis et al. | Dec. 15, 1914 |
| 1,320,818 | Youngblood | Nov. 4, 1919 |
| 1,386,813 | Townsend | Aug. 9, 1921 |
| 1,498,133 | Swem et al. | June 17, 1924 |
| 1,582,198 | Walbridge | Apr. 27, 1926 |
| 1,873,057 | Smith | Aug. 23, 1932 |
| 1,951,844 | Rose | Mar. 20, 1934 |
| 1,964,874 | Fankboner | July 3, 1934 |
| 1,966,347 | Hughey | July 10, 1934 |
| 2,118,871 | Broekhuysen | Jan. 30, 1940 |
| 2,246,968 | Antrim | June 24, 1941 |